(12) United States Patent
Tahira

(10) Patent No.: US 8,136,566 B2
(45) Date of Patent: Mar. 20, 2012

(54) LAMINATING APPARATUS

(75) Inventor: Hiroki Tahira, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 555 days.

(21) Appl. No.: 12/375,581

(22) PCT Filed: Apr. 17, 2008

(86) PCT No.: PCT/JP2008/057545
§ 371 (c)(1),
(2), (4) Date: Jan. 29, 2009

(87) PCT Pub. No.: WO2008/136276
PCT Pub. Date: Nov. 13, 2008

(65) Prior Publication Data
US 2009/0314420 A1    Dec. 24, 2009

(30) Foreign Application Priority Data

Apr. 26, 2007    (JP) ................. 2007-116802

(51) Int. Cl.
*H01M 8/24* (2006.01)
*H01M 2/14* (2006.01)
*B29C 65/78* (2006.01)
*B32B 37/02* (2006.01)

(52) U.S. Cl. ........ 156/559; 156/556; 156/563; 156/580; 100/221; 100/224; 429/467; 429/511; 429/535

(58) Field of Classification Search .................. 100/221, 100/214, 224
See application file for complete search history.

(56) References Cited

U.S. PATENT DOCUMENTS 4,696,180 A * 9/1987 Zandel ............................ 72/456
4,776,919 A * 10/1988 Troutner et al. ............... 156/499
6,076,582 A * 6/2000 Thary ............................ 156/500
2006/0254718 A1 11/2006 Chien

FOREIGN PATENT DOCUMENTS

| EP | 1 361 556 | 11/2003 |
|---|---|---|
| JP | 63-049424 | 3/1988 |
| JP | 4-33539 | 3/1992 |
| JP | 8-293131 | 11/1996 |
| JP | 2003-022827 | 1/2003 |
| JP | 2005-079024 | 3/2005 |
| JP | 2007-510279 | 4/2007 |
| JP | 2008-023664 | 2/2009 |
| WO | 98/09814 | 3/1998 |

* cited by examiner

*Primary Examiner* — John L. Goff
*Assistant Examiner* — Barbara J Musser
(74) *Attorney, Agent, or Firm* — Rankin, Hill & Clark LLP

(57) ABSTRACT

A laminating apparatus for laminating a separator, a membrane electrode structure member and another separator on top of each other includes a placement base which places the separator on the placement base, a first clamp which holds a portion of the upper surface of the separator placed on the placement base, first moving means which superimpose the membrane electrode structure member on the upper surface of the separator placed on the placement base, a second clamp which holds a portion of the upper surface of the thus superimposed membrane electrode structure member, second moving means which superimpose the separator on the upper surfaces of the membrane electrode structure member and second clamp, a pressing member which presses the separator in the central portion thereof to deform the separator elastically to thereby bring the separator into contact with the membrane electrode structure member, and pull-out means which pull out the second clamp from between the membrane electrode structure member and separator.

15 Claims, 19 Drawing Sheets

LAMINATING APPARATUS

TECHNICAL FIELD

The present disclosure to a laminating method and a laminating apparatus for laminating sheet-shaped members such as membrane electrode structures and separators used in a fuel cell of a solid high polymer type.

BACKGROUND ART

In a fuel cell of a solid high polymer type, oxygen or hydrogen is supplied to a plurality of cells which are formed by laminating membrane electrode structures and separators alternately on top of each other to cause a chemical reaction, thereby generating electric power.

The fuel cell attracts attention because the fuel cell provides high power generation efficiency and does not discharge carbon dioxide. There has been developed means for laminating alternately membrane electrode structures and separators on top of each other. As the reference that relates to such laminating means, for example, there is available the Japanese patent publication 2003-22827. Also, the present applicants have proposed, in the patent application No. 2006-199573,, a laminating apparatus which superimposes sheet-shaped members on top of each other in such a manner that the sheet-shaped members are pressed from below using a lift device to maintain the positions of the upper surfaces of the sheet-shaped members at a constant height.

A related-art fuel cell is an object to be studied and the mass production or the cost reduction of the fuel cell has not been examined sufficiently. An operation to laminate alternately the membrane electrode structures and separators on top of each other, in some cases, relies on manpower.

In order to be able to mass produce fuel cells and reduce the costs of the fuel cell as well as to maintain the power generation performance at a proper level, it is desired to laminate the membrane electrode structures and separators more accurately and quickly.

DISCLOSURE OF THE INVENTION

The invention provides a laminating method and a laminating apparatus which can laminate or superimpose sheet-shaped members such as membrane electrode structures and separators on top of each other more accurately and quickly.

According to a first aspect of the invention, a laminating method for laminating a second sheet-shaped member on top of at least a first sheet-shaped member, is provided with a first step of placing the first sheet-shaped member on a placement portion and holding a second surface of the first sheet-shaped member by clamp means; a second step of superimposing the second sheet-shaped member on the second surface of the first sheet-shaped member while the first sheet-shaped member is being held by the clamp means, and pressing the second sheet-shaped member using pressing means to deform it elastically, thereby bringing at least a portion of the second sheet-shaped member into contact with the first sheet-shaped member; and, a third step of pulling out the clamp means from between the first and second sheet-shaped members using pull-out means.

That is, the first sheet-shaped member, in the initial stage thereof, is held by the clamp means and next, after the first sheet-shaped member is held through the second sheet-shaped member by the pressing means, the clamp means is pulled. Therefore, for the first sheet-shaped member, there is no step in which the first sheet-shaped member is not fixed to the placement portion, which prevents the first sheet-shaped member from being shifted in position.

According to a second aspect of the invention, in the third step, the clamp means may also be moved to another position once before it is pulled out laterally.

Also, according to a third aspect of the invention, there is provided a laminating apparatus for laminating at least a first sheet-shaped member, a second sheet-shaped member and a third sheet-shaped member on top of each other. Specifically, the laminating apparatus is provided with a placement portion for placing the first sheet-shaped member thereon; first clamp means for holding a portion of the upper surface of the first sheet-shaped member placed on the placement portion; means for superimposing the second sheet-shaped member on the upper surface of the first sheet-shaped member placed on the placement portion; second clamp means for holding a portion of the upper surface of the second sheet-shaped member superimposed on the upper surface of the first sheet-shaped member; means for superimposing the third sheet-shaped member on the upper surfaces of the second sheet-shaped member and the second clamp means; pressing means for pressing the third sheet-shaped member in the other portion thereof than the second clamp means to deform the third sheet-shaped member elastically, thereby bringing at least a portion of the third sheet-shaped member into contact with the second sheet-shaped member; and, pull-out means for pulling out the clamp means from between the second and third sheet-shaped members. That is, the second sheet-shaped member, in the initial stage thereof, is held by the second clamp means and next, after the second sheet-shaped member is held through the third sheet-shaped member by the pressing means, the clamp means is pulled. Therefore, for the first sheet-shaped member, there is no step in which the third sheet-shaped member is not fixed to the placement portion, which prevents the third sheet-shaped member from being shifted in position.

According to a fourth aspect of the invention, when the second clamp means is lifted once using a clamp lift mechanism before it is pulled out laterally by the pull-out means, the second clamp means may be prevented from sliding on at least the upper surface of the second sheet-shaped member.

According to a fifth aspect of the invention, the first sheet-shaped member may also be held by and between the placement portion and the first clamp means in such a manner that the placement portion is lifted by a placement portion lift mechanism. In this case, the upper surface of the first sheet-shaped member can be maintained at the height of the first clamp means, which can simplify or eliminate the height control when the second moving means carries the second sheet-shaped member.

According to a sixth aspect of the invention, the first clamp means may be retreated once after the second sheet-shaped member is superimposed on top of the first sheet-shaped member. p Also, the first clamp means is disposed upwardly of the third sheet-shaped member placed on top of the second sheet-shaped member. Further, the thus superimposed first, second and third sheet-shaped members are held by and between the placement portion and the first clamp means in such a manner that the placement portion is lifted by the placement portion lift mechanism. Owing to this, the upper surface of the thus laminated assembly can be maintained at the height of the first clamp means, which can simplify or eliminate the height control when the first and second moving means carry the respective sheet-shaped members.

According to a seventh aspect of the invention, the pressing means may press the third sheet-shaped member at least at two points spaced from each other in the longitudinal direction of the third sheet-shaped member. This can prevent the laminated assembly against rotation, thereby being able to superimpose the respective sheet-shaped members on top of each other with more accuracy.

According to an eight aspect of the invention, the second clamp means may include two clamp means respectively disposed on the right and left sides of the placement portion, and the longitudinal direction center line of the portion of the pressing means for pressing the third sheet-shaped member may also be substantially perpendicular to a line connecting together the respective centers of the two clamp means at the middle point of the line. According to this structure, the second sheet-shaped member can be pressed in a well-balanced manner. Also, the second sheet-shaped member can be prevented from being elastically deformed excessively on either side thereof.

According to a ninth aspect of the invention, the two second clamp means may also be respectively disposed on the transverse direction right and left sides of the third sheet-shaped member in the placement portion, the longitudinal direction center line of the portion of the pressing means for pressing the third sheet-shaped member may be substantially perpendicular to a line connecting together the respective centers of the two second clamp means, and the length of the longitudinal direction center line with respect to the longitudinal direction of the third sheet-shaped member is within twice the length of the second clamp means. According to this structure, it is possible to prevent the portion of the third sheet-shaped member to be covered by the second clamp means from being expanded in an arc.

Here, according to the present invention, the terms "upper surface", "lower surface", "upper layer" and "lower layer" are respectively expedient expressions to specify the directions of the respective sheet-shaped members, and thus they are not limited to a case where the sheet-shaped members are superimposed on top of each other in the upward direction.

In the laminating method and laminating apparatus according to the invention, the lower-layer sheet-shaped member or the second sheet-shaped member is held by the clamp means in the initial stage thereof. Next, after it is held by the pressing means through the upper-layer sheet-shaped member or third sheet-shaped member, the clamp means is pulled out.

Therefore, for the lower-layer sheet-shaped member or second sheet-shaped member, there is no step in which it is not fixed to the placement portion, thereby being able to prevent it from being shifted in position.

Other characteristics and effects of the invention are obvious from the following description of the embodiments thereof and the appended claims.

BEST MODE FOR CARRYING OUT THE INVENTION

Now, description will be given below of a laminating method and a laminating apparatus according to a typical embodiment of the invention with reference to FIGS. 1 to 19.

Figure 1:
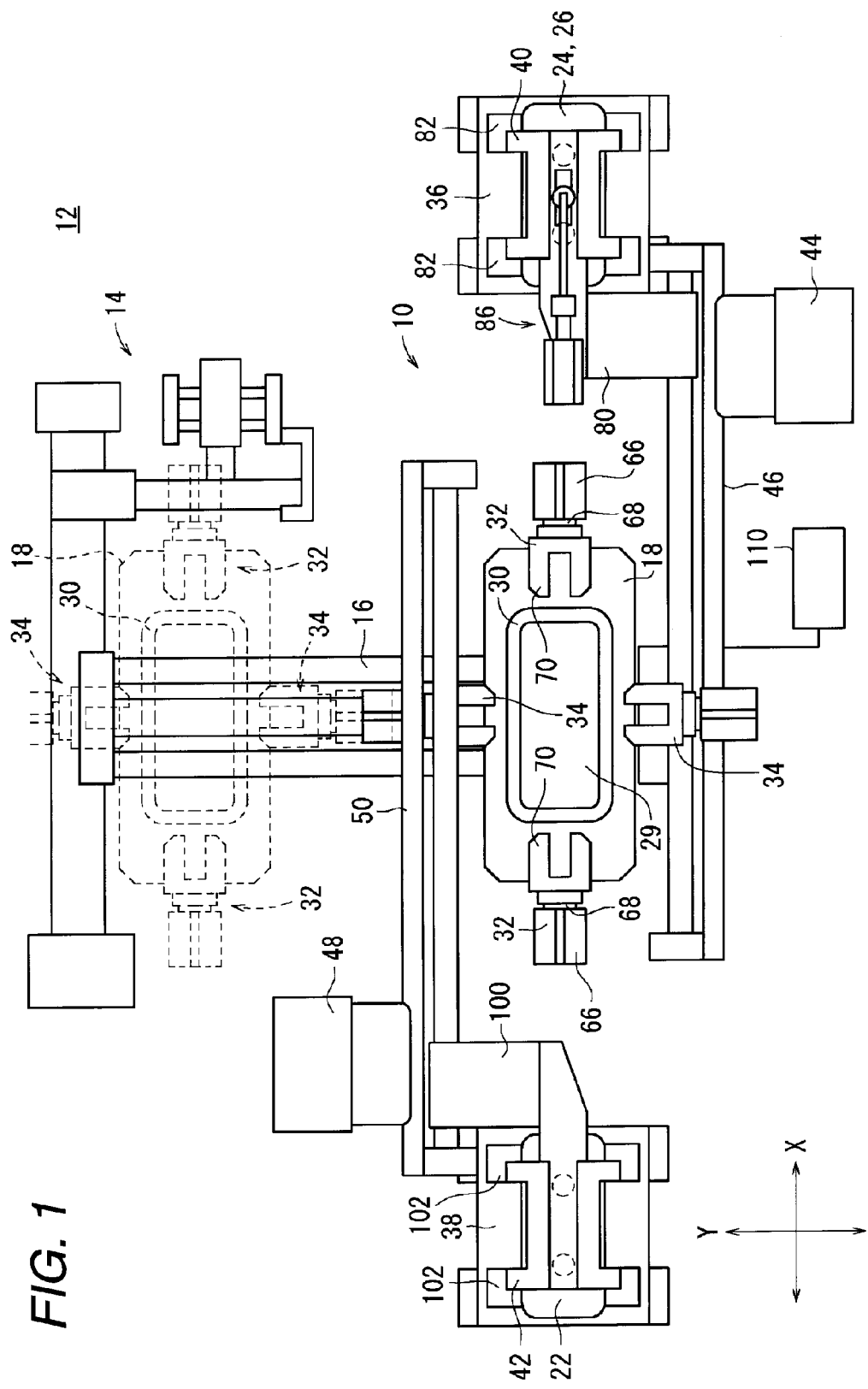
FIG. 1 is a plan view of an assembly line.

As shown in FIG. 1, a laminating apparatus 10 according to a typical embodiment of the invention is incorporated in an assembly line 12. The assembly line 12 includes, besides the laminating apparatus 10, a connecting pin striking apparatus 14. The laminating apparatus 10 and connecting pin striking apparatus 14 are connected together through a rail 16. A base plate 18 is provided such that it can move on the rail 16 reciprocatingly.

The connecting pin striking apparatus 14 is an apparatus which is used to strike a connecting pin into a given insertion hole formed in a laminated assembly 29 (see FIG. 2) formed in the laminating apparatus 10. The connecting pin striking apparatus 14 fastens together the connecting pin and the laminated assembly 29.

The laminating apparatus 10 is an apparatus which is used to superimpose a membrane electrode structure member 22 (a second sheet-shaped member, or a lower-layer sheet-shaped member) and two separators 24 (a first sheet-shaped member) and 26 (a third sheet-shaped member, or an upper-layer sheet member) on top of each other The second sheet-shaped member 22 is interposed between the two separators 24 and 26 to thereby form a unit cell that is used in a fuel cell of a solid high polymer type. The two separators 24 and 26 are similar in structure to each other. The membrane electrode structure member 22 is also referred to as an MEA (Membrane Electrode Assembly). The membrane electrode structure member 22 and separators 24, 26 are respectively thin sheet-shaped members.

However, in the drawings, in order to facilitate the understanding of their structures, they are shown to be thick to a proper degree.

Figure 2:
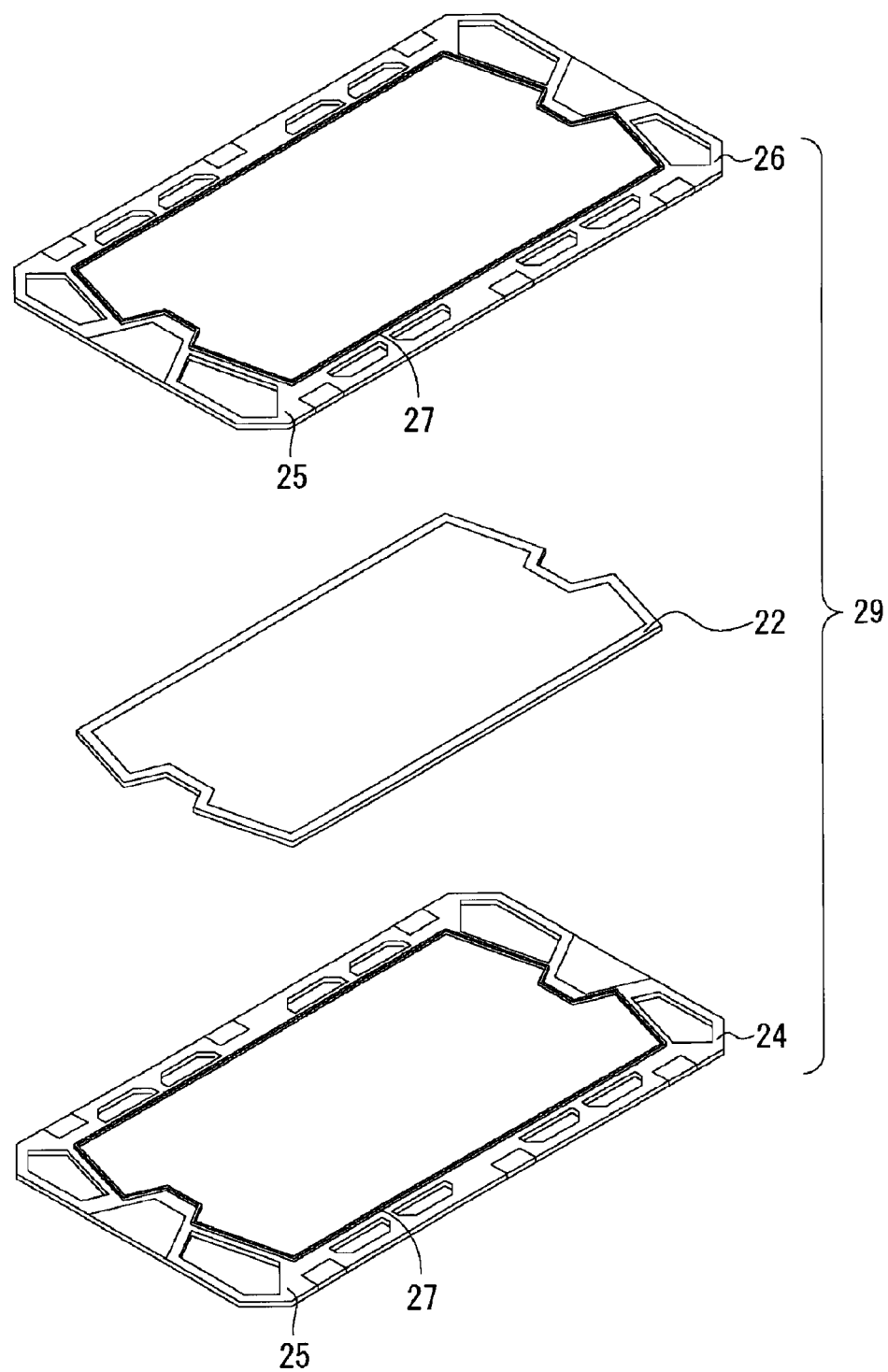
FIG. 2 is an exploded perspective view of a laminated assembly.

As shown in FIG. 2, the separators 24 and 26 are respectively thin sheet-shaped members and also each of the separators 24 and 26 has a rather long square shape with a frame 25 provided on the peripheral portion of the separators 24 and 26. On the inner peripheral side of the frame 25, there is provided a low projection 27 which is used to position the separator. The membrane electrode structure member 22 is a thin sheet-shaped member and is rather smaller in size than the separators 24 and 26. The membrane electrode structure member 22 has such a shape that allows it to be fitted into the inside of the projection 27 of the lower-layer separator 24. The membrane electrode structure member 22 is sandwiched by the two separators 24 and 26 to form the laminated assembly 29 serving as a unit cell.

Referring back again to FIG. 1, the laminating apparatus 10 includes a placement base (a placement portion) 30 formed on a base plate 18, a pair of first clamps 32 respectively provided on the longitudinal direction (which is hereinafter referred to as the X direction as well) two end portions of the placement base 30, and a pair of second clamps 34 respectively provided on the transverse direction (which is hereinafter referred to as the Y direction as well) two end portions of the placement base 30. Further, the laminating apparatus 10 includes a first stocker 36 disposed on the right side of FIG. 1, a second stocker 38 disposed on the left side of FIG. 1, a first moving device (means for superimposing the second sheet-shaped member on the upper surface of the first sheet-shaped member placed on the placement portion) 40 structured such that it can be reciprocatingly moved between the first stocker 36 and placement base 30, and a second moving device (means for superimposing the third sheet-shaped member on the upper surfaces of the second sheet-shaped member and second clamp) 42 structured to be reciprocatingly movable between the second stocker 38 and placement base 30. The first clamps 32 can be contacted with the upper surfaces of the two end portions of the separator 24 or 26, and are fixed. The second clamps 34 can be contacted with the upper surface of the end portion of the membrane electrode structure member 22 placed on the separator 24, and are fixed. The separator 26 is to be superimposed on the upper surface of the membrane electrode structure member 22 and second clamp 34 and presses the central portion of the separator 26 using a pressing member 96 (see FIG. 6) which will be discussed later, thereby bringing the same central portion into contact with the membrane electrode structure member 22.

The first stocker 36 stores a fairly large number of separators 24 and 26. The separators 24 and 26 may differ in the details thereof from each other and, in this case, they may also be stored separately in their individual stockers. The second stocker 38 stores a fairly large number of membrane electrode structure members 22. The first moving device 40 takes out the separator 24 (or 26) from the first stocker 36, moves along a rail 46 to the placement base 30 carrying the separator 24 (or 26) while the first moving device 40 is driven by a drive portion 44, and places the thus-carried separator 24 (or 26) onto the placement base 30. The second moving device 42 takes out the membrane electrode structure member 22 from the second stocker 38, moves along a rail 50 to the placement base 30 carrying the membrane electrode structure member 22 which the second moving device 42 is driven by a drive portion 48, and places the thus-carried membrane electrode structure member 22 onto the placement base 30.

Figure 3:
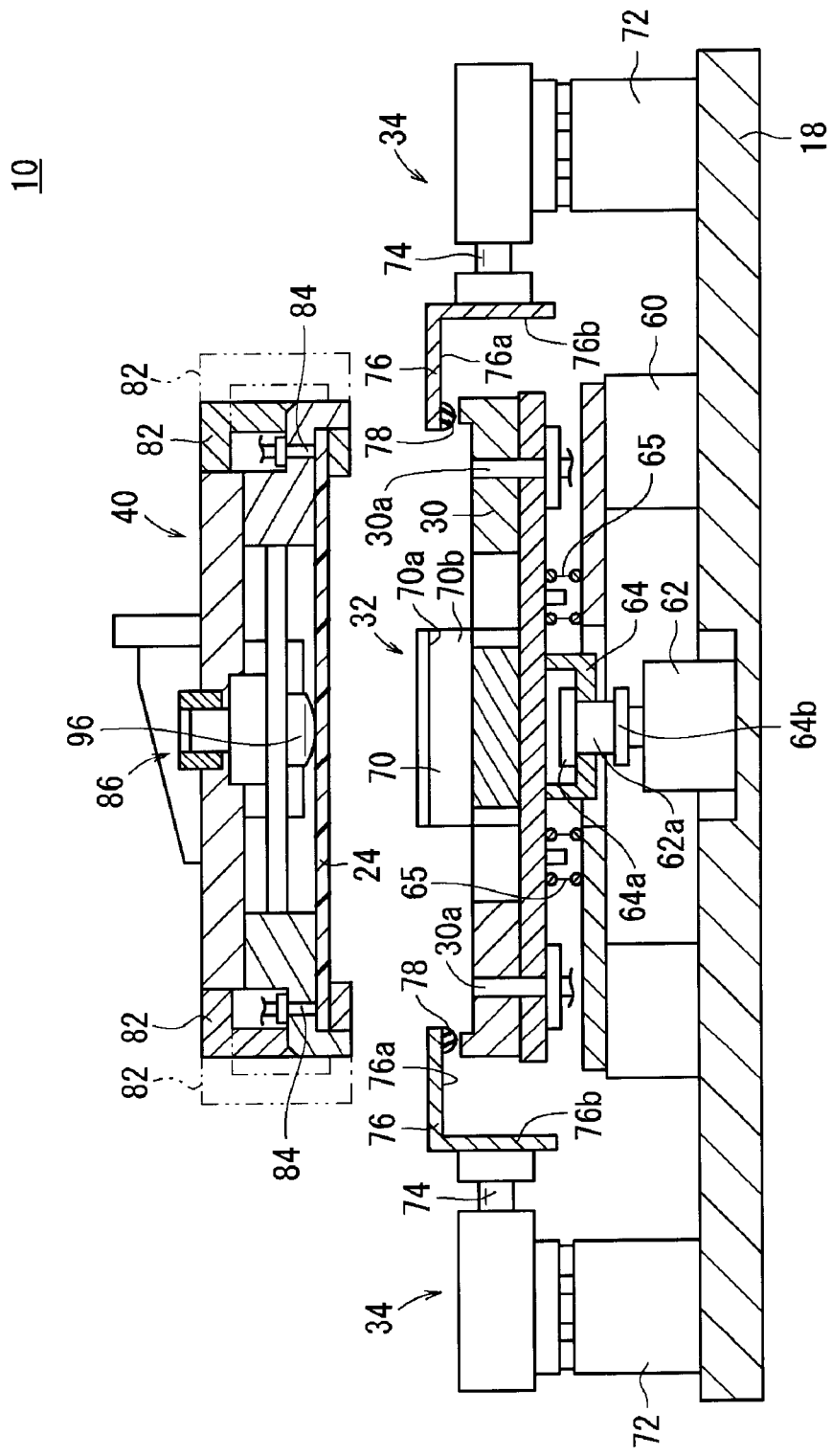
FIG. 3 is a sectional side view of a laminating apparatus.

As shown in FIG. 3, the base plate 18 includes a mount base 60 and a lift device 62 provided on the central portion of the mount base 60. The placement base 30 is mounted on a rod 62a, through a hollow joint 64 in such a manner that the placement base 30 can be lifted and lowered. On the rod 62a, there are provided a first flange 64a, which is situated at the upper end of the rod 62a,, and a second flange 64b, which is situated slightly downwardly of the first flange 64a. The placement base 30 is elastically supported by a plurality of coil springs 65 with respect to the mount base 60.

Although description of the detailed structure of the mount base 60 is omitted here, the mount base 60 is structured such that it can be rotated on two horizontal axes and within a horizontal plane. The positions and directions of the separators 24, 26 and membrane electrode structure member 22 can be detected using a plurality of imaging means (not shown).

The mount base 60 can adjust itself automatically in such a manner that it can be matched to the thus-detected positions and directions.

The first flange 64a, is disposed within the joint 64 and is structured such that, when the rod 62a, extends, the first flange 64a, can be contacted with the lower surface of the placement base 30 to thereby push up the placement base 30 and, when the rod 62a, retracts, the first flange 64a, can be contacted with the bottom surface of the joint 64 to thereby lower the placement base 30 against the elastic forces of the coil springs 65.

The placement base 30 includes a plurality of suction portions 30a, for sucking the separator 24. Specifically, the suction portion 30a,, using sucking means (not shown), sucks the lower-layer separator 24 due to vacuum action. The sucking portions 30a, (and 84, 104) include valves (not shown), whereby the sucking portions 30a, are capable of switching the on/off of the sucking operations of the sucking portions 30a, using the valves.

As shown in FIGS. 1 and 3, the two first clamps 32 are respectively disposed on the base plate 18 and each first clamp 32 includes a clamp lift portion 66 and an advance/retreat portion 68 which are respectively made of cylinders. A clamp member 70 is provided on the leading end portion of the advance/retreat portion 68. The clamp member 70 has an L-like shape, and includes a lower surface 70a, to be contacted with the upper surfaces of the end portions of the separators 24 and 26 and a stopper surface 70b, set perpendicular to the lower surface 70a, and contactable with the side surface of the placement base 30.

As shown in FIG. 3, the two second clamps 34 are respectively disposed on the base plate 18. Each second clamp 34 includes a clamp lift portion 72 and an advance/retreat portion (pull-out means) 74 which are respectively made of cylinders. A clamp member 76 is provided on the leading end portion of the advance/retreat portion 74. The clamp member 76 has an L-like shape, and includes a lower surface 76a, to be contacted with the upper surface of the end portion of the membrane electrode structure member 22 and a stopper surface 76b, set perpendicular to the lower surface 76a, and contactable with the side surface of the placement base 30.

Figure 4:
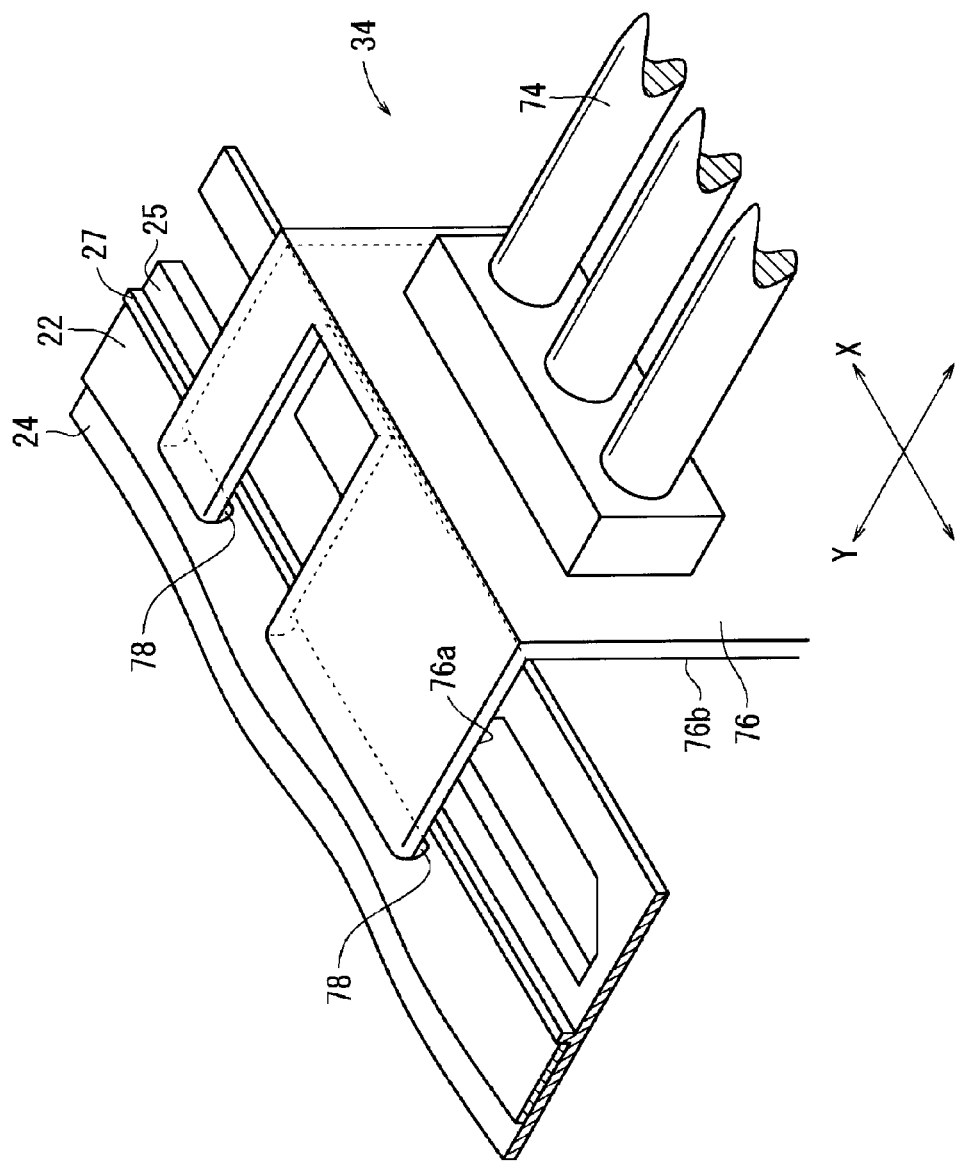
FIG. 4 is a partially sectional perspective view of a second clamp and its periphery.

As shown in FIG. 4, the clamp member 76 is divided into two sections when the clamp member 76 is viewed from above.

A small projection 78 made of resin (for example, urethane) is provided on the lower surface of the leading end of each section. The reason why the clamp member 76 is divided into the two sections is to avoid the interference of the clamp member 76 with a given positioning pin.

Figure 5:
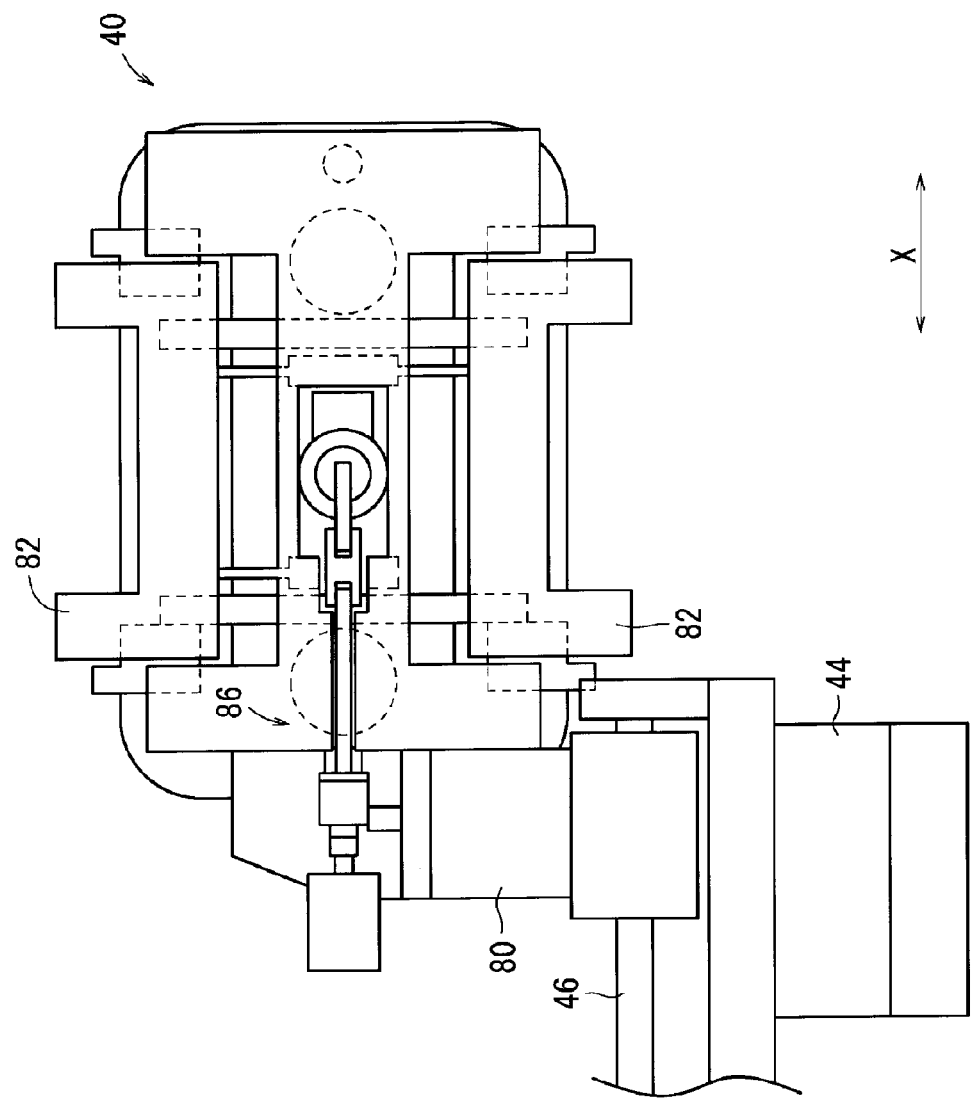
FIG. 5 is a plan view of a first moving device.

As shown in FIG. 5, the first moving device 40 includes a hand 80 to be connected to the drive portion 44, a pair of grip portions 82 respectively formed in the hand 80 in such a manner that they can be opened and closed, two suction portions 84 (see FIG. 3) respectively formed in the hand 80, and a pressing jig (a pressing mechanism) 86. The grip portions 82 are structured such that, when they are closed, they can hold the separators 24, 26. The suction portions 84 are connected to sucking means and, due to the vacuum action, can suck the separators 24, 26.

Figure 6:
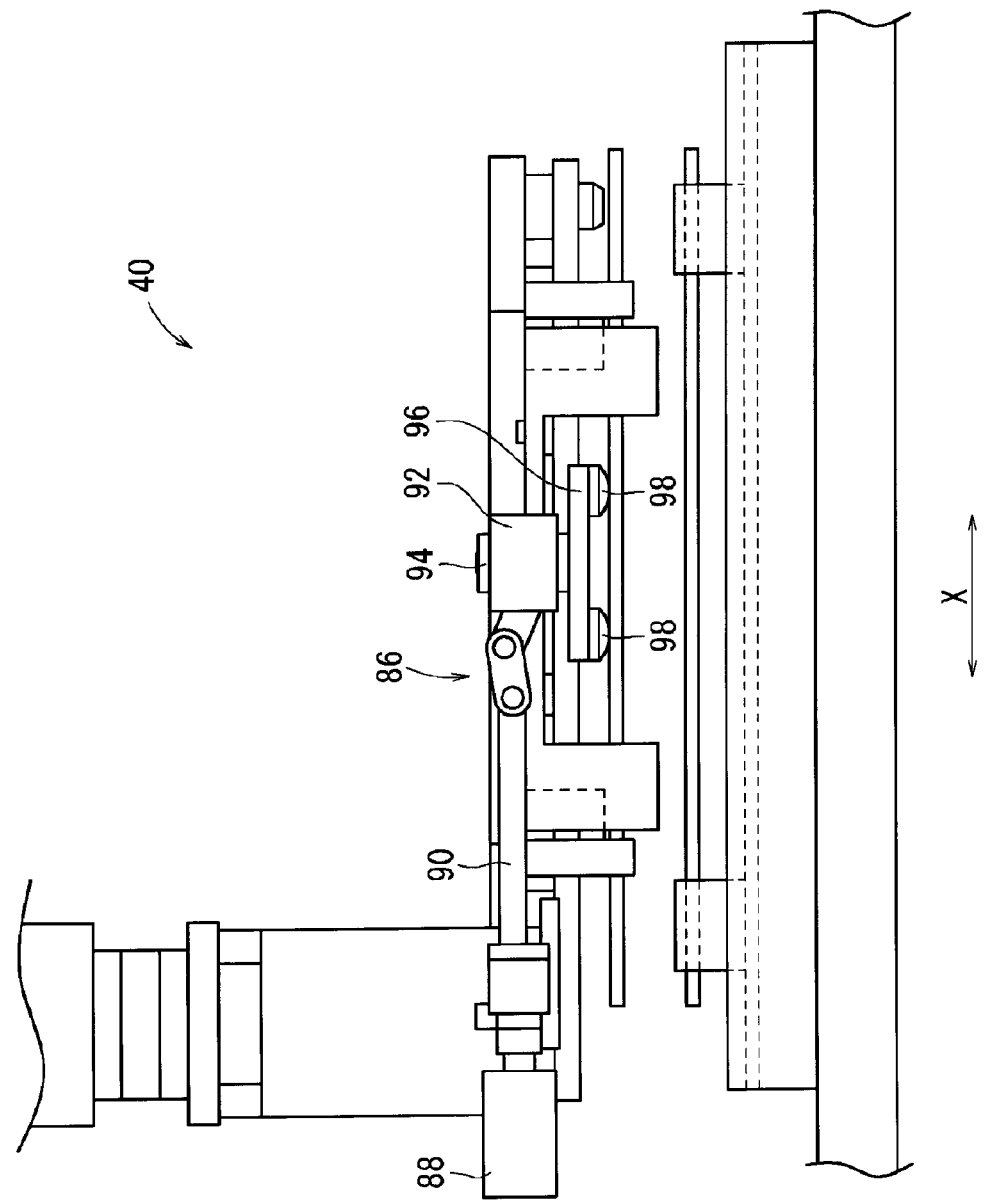
FIG. 6 is a side view of the first moving device.

As shown in FIG. 6, the pressing jig (pressing mechanism) 86 includes a cylinder 88, a link mechanism 90, a vertical guide barrel 92, a lift rod 94 inserted through the guide barrel 92, and a pressing member 96 provided on the lower end of the lift rod 94. According to the pressing jig 86, owing to the operation of the cylinder 88, the link mechanism 90 can be operated to thereby be able to lift and lower the lift rod 94 along the guide barrel 92. The pressing member 96 has a plate-like shape long in the X direction and includes, on the lower surfaces of the X-direction two ends of the pressing member 96, substantially semicircular pads 98 which are made of resin (for example, urethane) and are projected downwardly.

As shown in FIG. 1, the second moving device 42 includes a hand 100 to be connected to the drive portion 48, a pair of grip portions 102 formed in the hand 100 in such a manner that they can be opened and closed, a suction portion 104 (see FIG. 13) formed in the hand 100. Each grip portion 102, when it is closed, is able to grip the membrane electrode structure member 22. The suction portion 104 is connected to sucking means and, owing to the vacuum action of the suction portion 104, is able to suck the membrane electrode structure member 22.

The assembly line 12, which includes the laminating apparatus 10 and connecting pin striking apparatus 14, is allowed to operate automatically under the operation of a control portion 110 (see FIG. 1). The control portion 110 is used to control the assembly line 12 according to a software processing which is executed by reading a given program.

Next, description will be given below mainly of the operation of the laminating apparatus 10 of the above-structured assembly line 12. This processing is carried out by the control portion 110.

Figure 7:
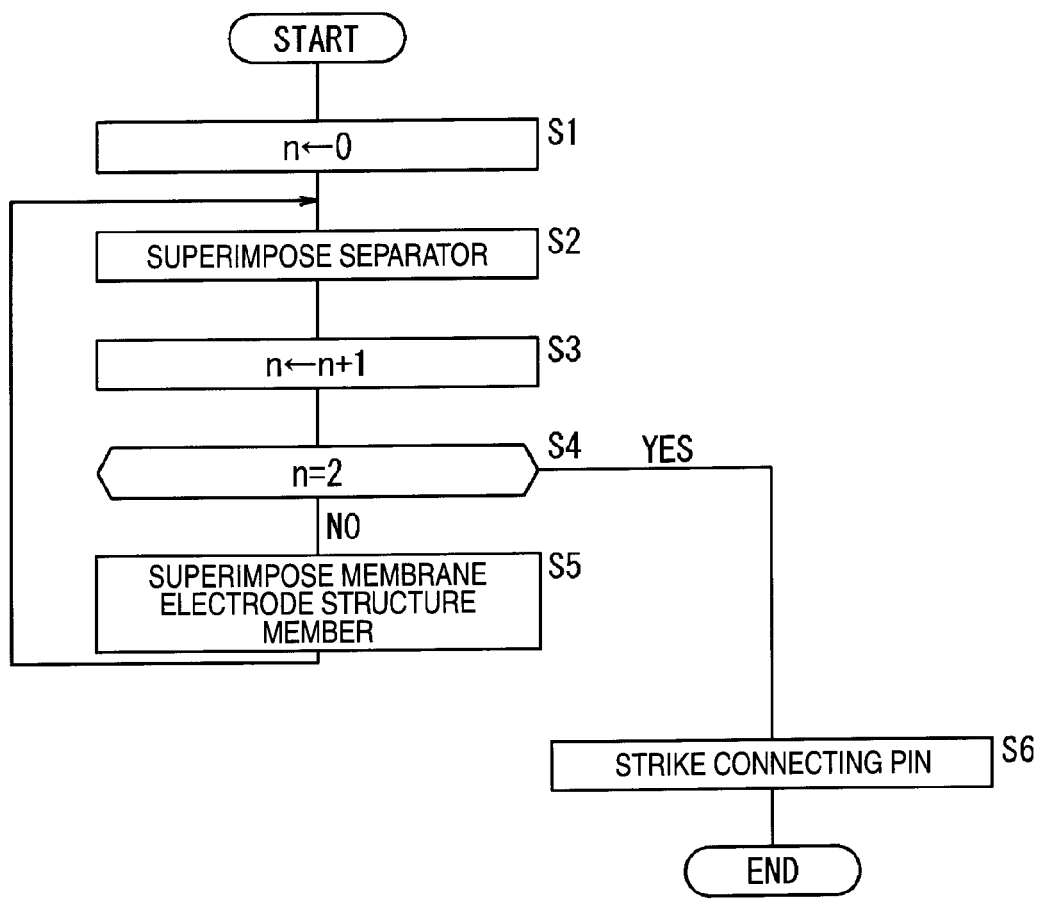
FIG. 7 is a flow chart of the procedure of a laminating method.

Firstly, in Step S1 shown in FIG. 7, a given counter n is reset to 0.

In step S2, the separator 24 or 26 is laminated.

In Step S3, the counter n is incremented. That is, n←n+1, is set.

In Step S4, the value of the counter n is confirmed.

When n=2,, the processing goes to Step S6 and, when n<2,, the processing goes to Step S5.

In Step S5, the membrane electrode structure member 22 is superimposed. Thereafter, the processing goes back to Step S2. That is, these steps S1 to S5 are used to count the number of times of the given laminating or superimposing operations.

In other words, these steps count the given number of separators 24, 26 and membrane electrode structure members 22.

On the other hand, in Step S6, the base plate 18 is moved to the connecting pin striking apparatus and the connecting pin is struck, thereby ending the processing shown in FIG. 7.

Next, description will be given below of the laminating operation of the lower-layer separator 24 (that is, the laminating operation to be carried out when n=0, in the above-mentioned step S2).

Figure 8:
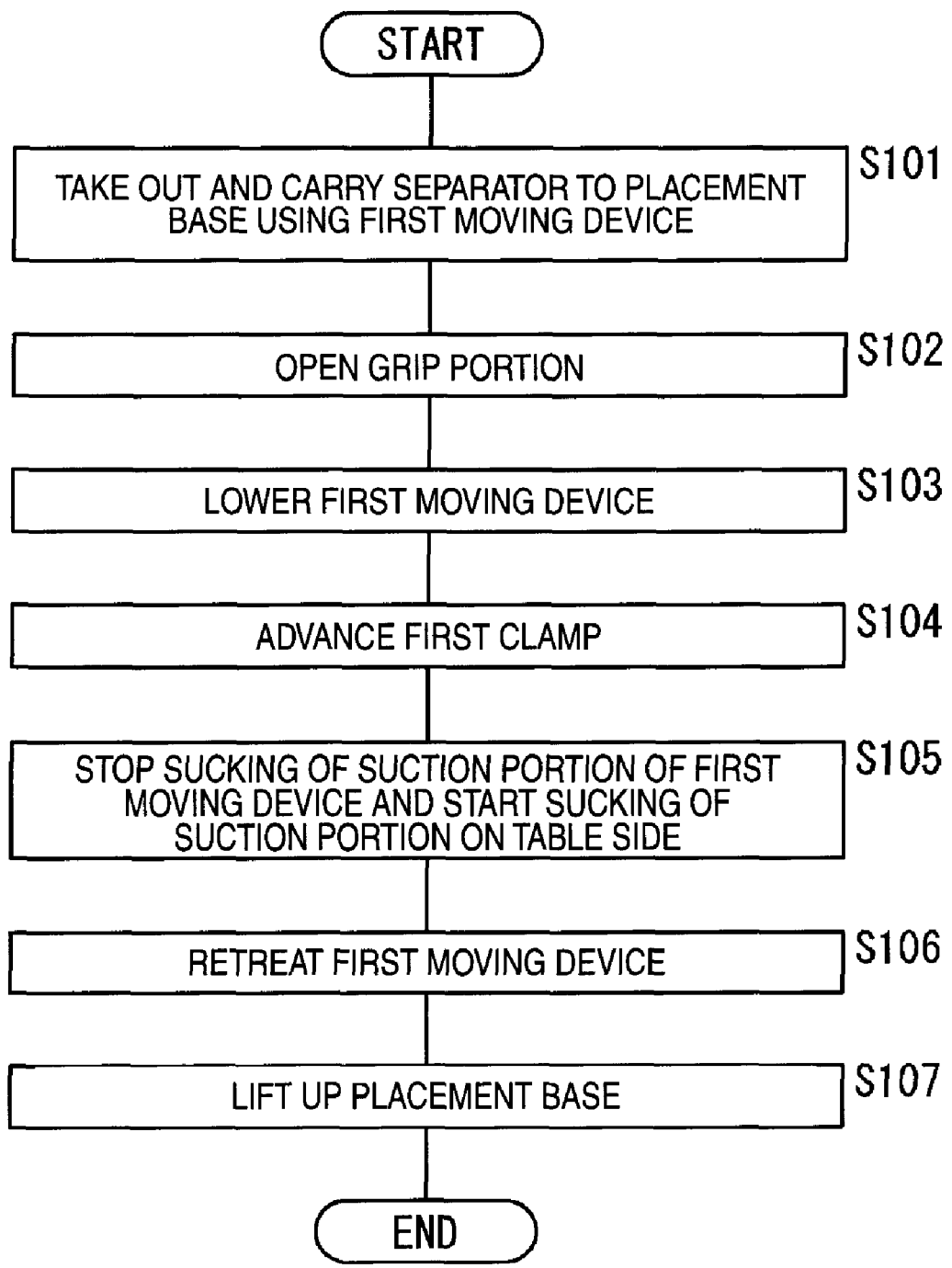
FIG. 8 is a flow chart of the procedure for placing a lower-layer separator.

Firstly, in Step S101 shown in FIG. 8, a sheet of separator 24 is taken out from the first stocker 36 using the first moving device 40 and is carried along the rail 46 to the placement base 30. In this case, as shown in FIG. 3, the first moving device 40 is present at the upward preparatory position of the placement base 30, while the separator 24 is gripped by the grip portions 82 and is also sucked by the suction portions 84. Also, the placement base 30 has been lowered down due to the operation of the lift device 62.

In Step S102, the grip portions 82 are opened (see virtual lines shown in FIG. 3). The separator 24 is still sucked by the sucking portions 84, whereby it is prevented from dropping down. When opening the grip portions 82, the grip portions 82 may be once lowered down slightly before opening in the horizontal direction. The reason for this is that the grip portions 82 are prevented from sliding on the surface of the separator 24. Here, the control portion 110 detects the position and direction of the separator 24 using a plurality of imaging means (not shown) and controls the movement of the mount base 60 in such a manner that the placement base 30 can be matched to the thus detected position and direction of the separator 24.

Figure 9:
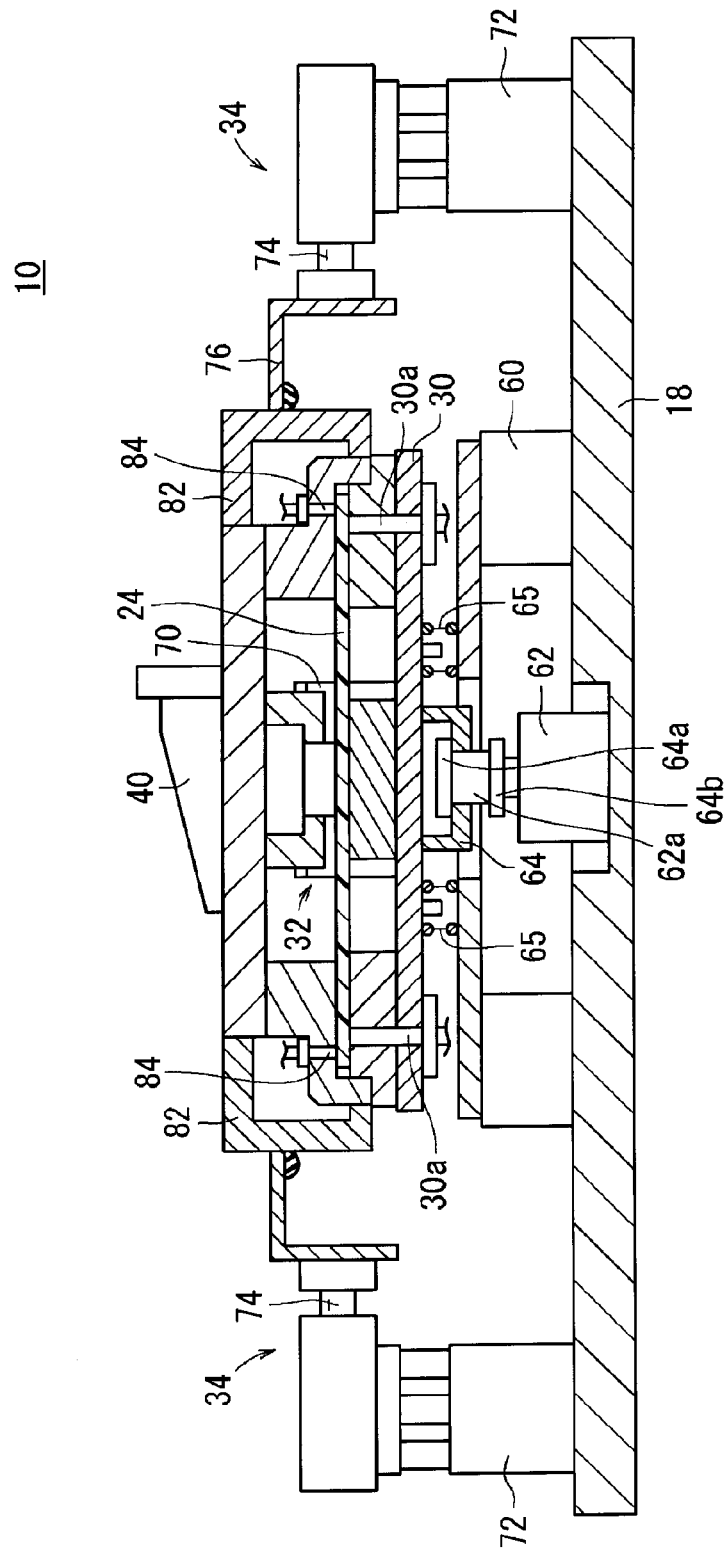
FIG. 9 is a sectional side view of the laminating apparatus, showing a state where the lower-layer separator is placed on a placement base.

In Step S103, as shown in FIG. 9, the first moving device 40 is lowered down and the separator 24 is put on the placement base 30 accurately.

Figure 11:
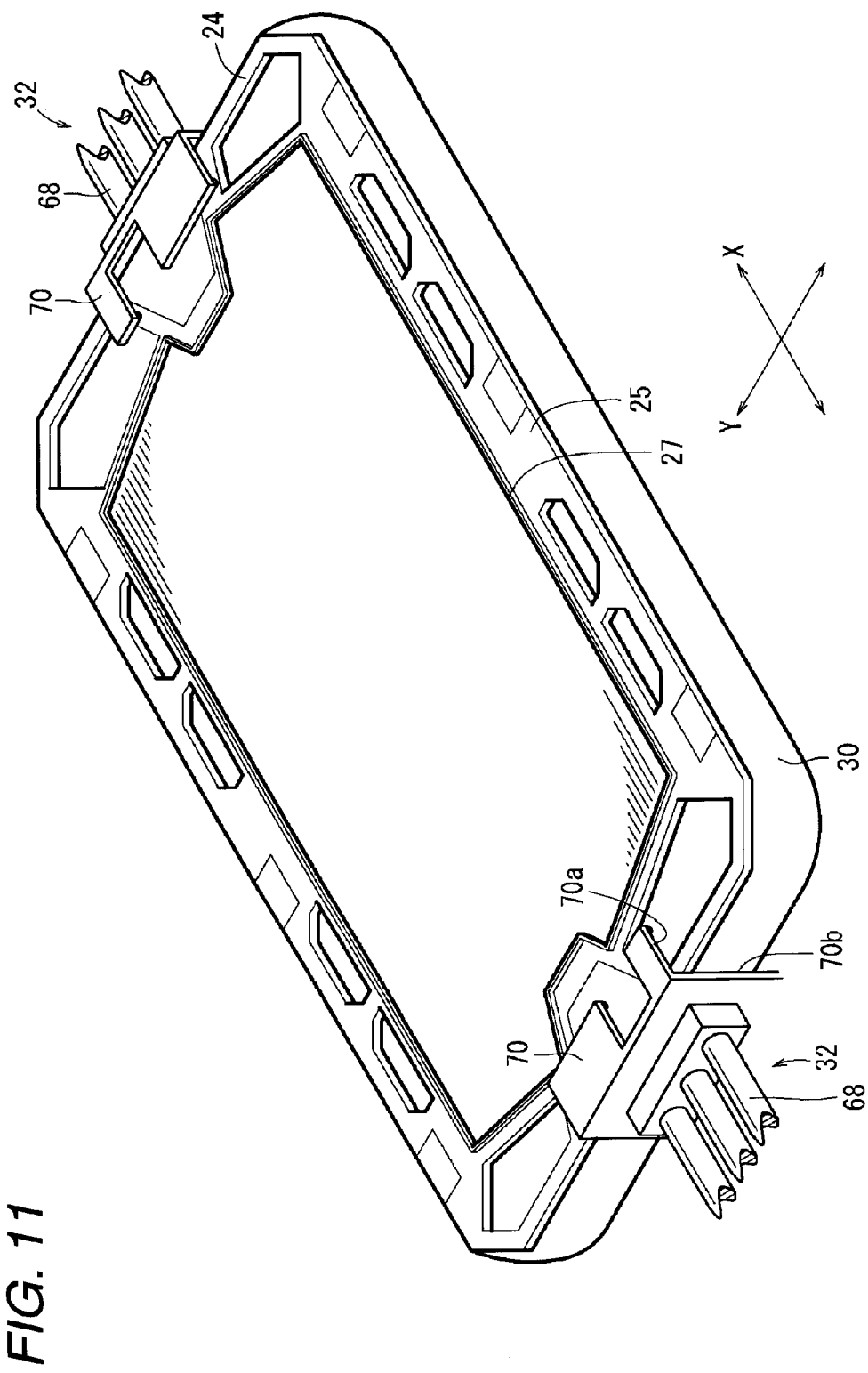
FIG. 11 is a perspective view of the lower-layer separator and placement base, showing a state where the lower-layer separator is placed on the placement base.

In Step S104, the first clamps 32, which are respectively situated on the X direction two ends of the placement base 30, are moved forward until the stopper surface 70b, comes into contact with the end face of the placement base 30 (which is a previous stage before a state shown in FIG. 11).

In Step S105, the sucking operations of the suction portions 84 of the first moving device 40 are caused to stop and, at the same time, the sucking operations of the suction portions 30a, on the table side are started.

In Step S106, the first moving device 40 is returned to the upward preparatory position of the placement base 30.

After then, the first moving device 40 is retreated to the position of the first stocker 36.

Figure 10:
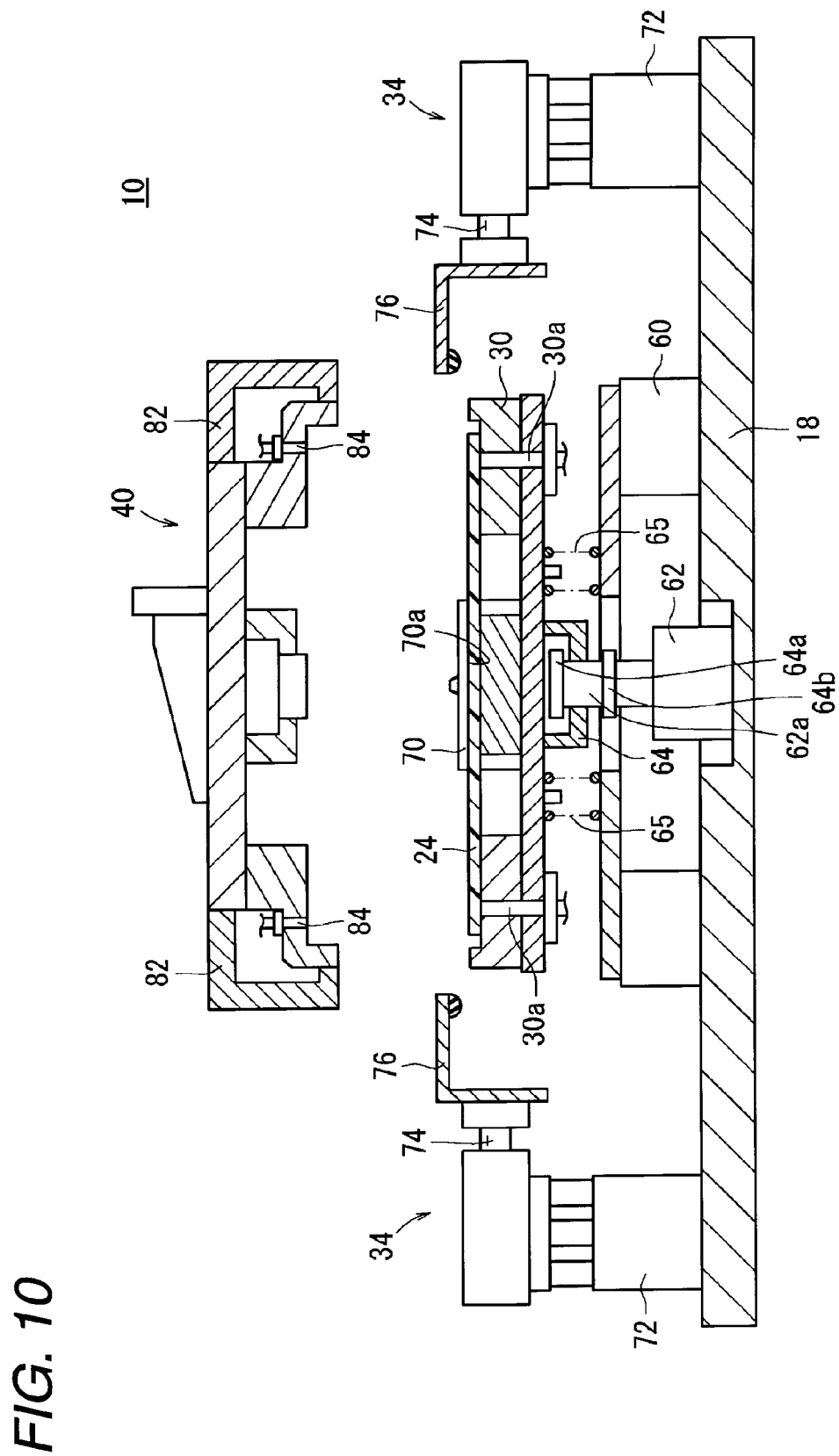
FIG. 10 is a sectional side view of the laminating apparatus, showing a state where a lift device is lifted.

In Step S107, as shown in FIGS. 10 and 11, the rod 62a is moved upward by the lift device 62. The placement base 30 is thus moved upward due to the elastic forces of the coil springs 65, whereby the separator 24 is sandwiched and fixed by the clamp members 70 of the first clamps 32 and placement base 30. In this case, the first flange 64a, is not contacted with the lower surface of the placement base 30 but the placement base 30 is pushed up due to the elastic forces of the coil springs 65, whereby the separator 24 can be fixed with a proper force. Here, the member for pushing up the placement base 30 has been described heretofore with reference to the example that uses the coil springs 65. However, it is also possible to use other elastic member, provided that such elastic member can fulfill an elastic force to fix the separator 24 with a proper force. For example, there may also be used a fluid damper (such as a pneumatic cylinder and a gas cylinder) and an elastic member made of Belleville springs superimposed on top of each other.

As described above, since the placement base 30 is moved upward by the lift device 62, the separator 24 is held by and between the placement base 30 and first clamps 32. Owing to this, the upper surface of the separator 24 is maintained at the height of the first clamps 32, thereby simplifying the height control to be carried out in Step S204 (which will be discussed later) when the second moving device 42 carries the membrane electrode structure member 22.

Next, description will be given below of the laminating operation of the membrane electrode structure member 22 (that is, the above-mentioned step S5).

Figure 12:
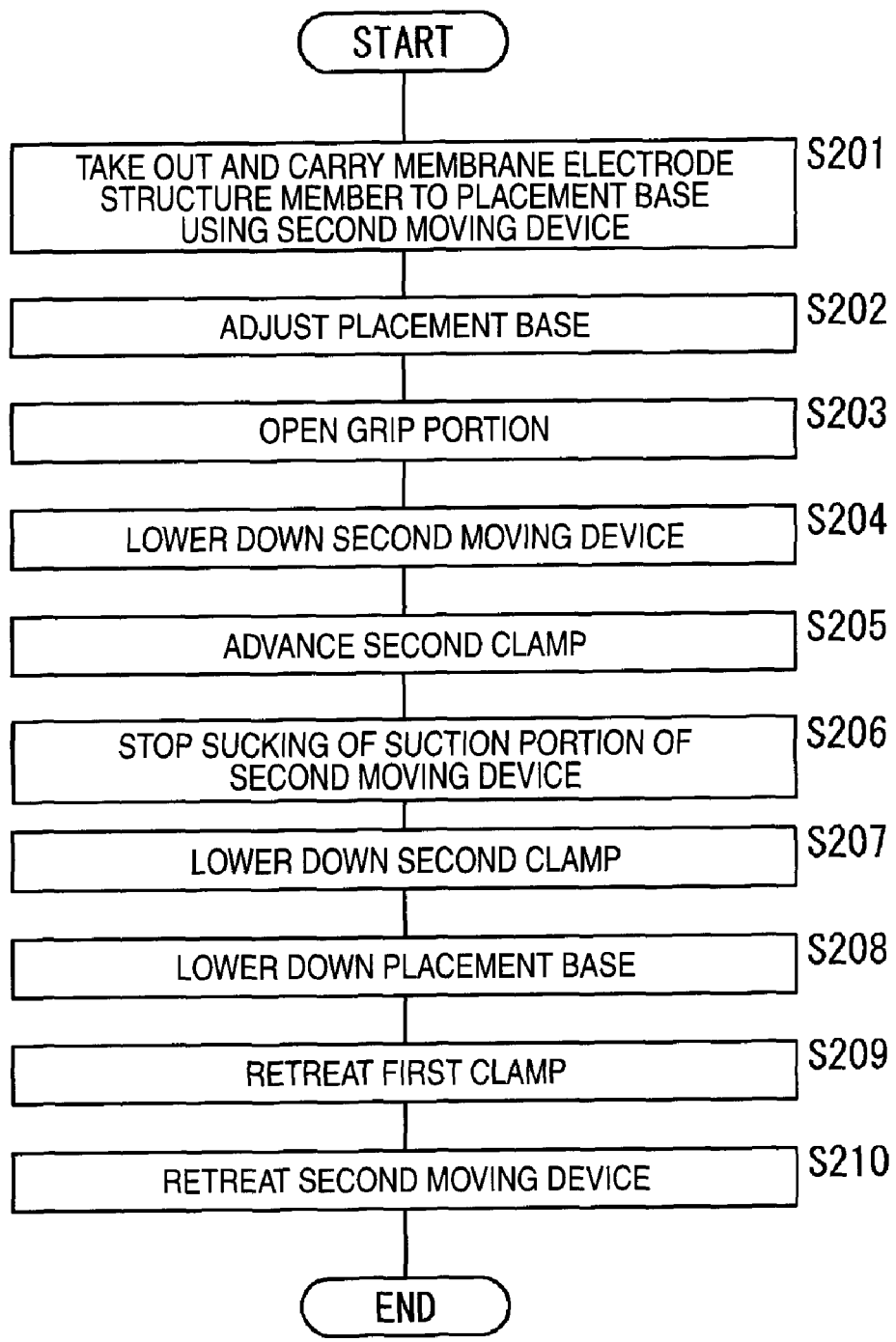
FIG. 12 is a flow chart of the procedure for placing a membrane electrode structure member.
Figure 13:
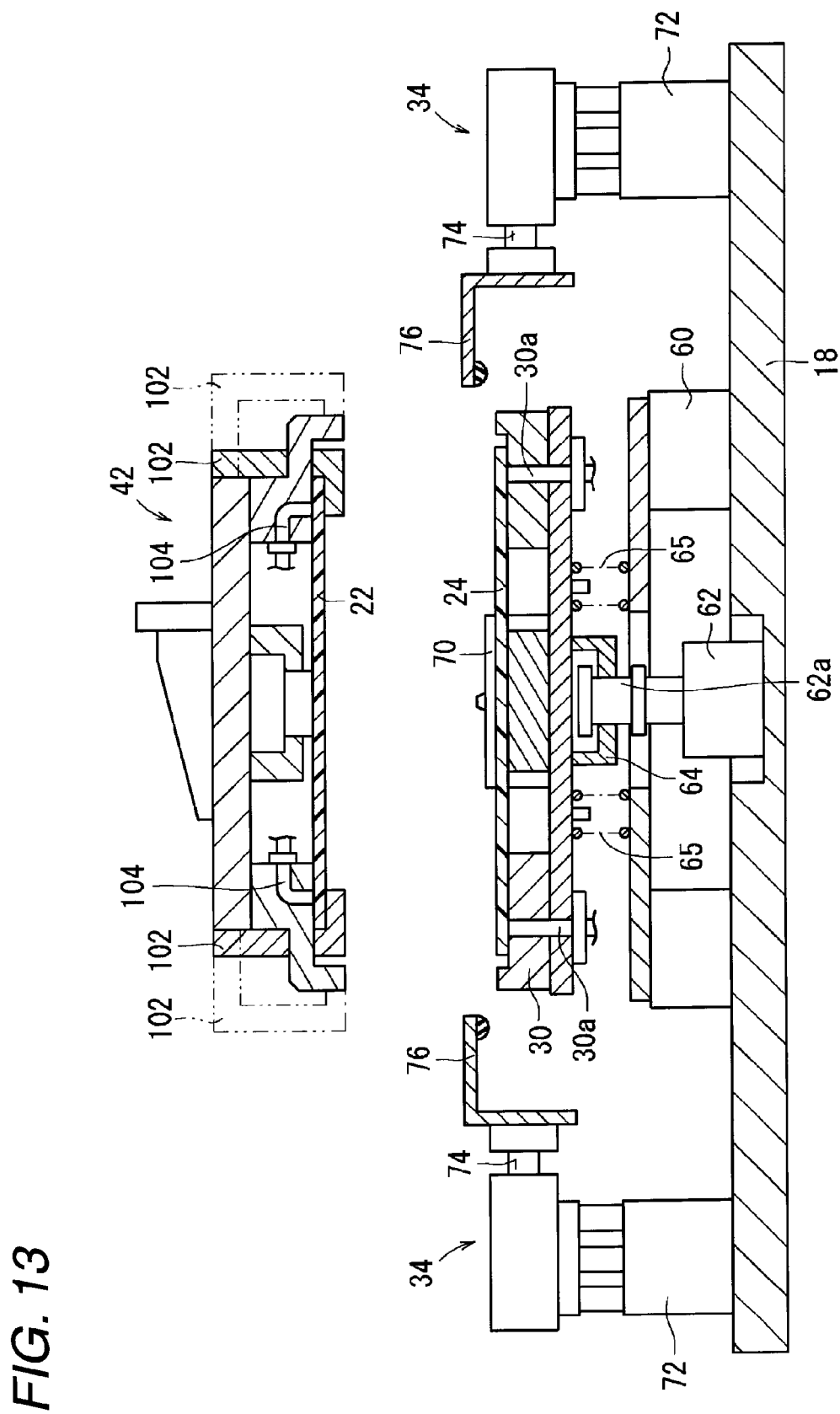
FIG. 13 is a sectional side view of the laminating apparatus, showing a state where the membrane electrode structure member is carried upwardly of the placement base by a second moving device.

Firstly, in Step S201 shown FIG. 12, a sheet of membrane electrode structure member 22 is taken out from the second stocker 38 using the second moving device 42 and is then carried to the placement base 30 along the rail 50 (see FIG. 1). In this case, as shown in FIG. 13, the second moving device 42 is situated at the upward preparatory position of the placement base 30, while the membrane electrode structure member 22 is gripped by the grip portions 102 and is also sucked by the suction portions 104. Also, the placement base 30 has been lifted due to the elastic forces of the coil springs 65 and fixes the separator 24 in cooperation with the clamp member 70.

In Step S202, the position of the lower-layer separator 24 is detected using imaging means (not shown), while the placement base 30 is moved in the XY direction and is also rotated horizontally to thereby control the placement base 30 so that it can be matched to the position and direction of the membrane electrode structure member 22.

In Step S203, the grip portions 102 are opened (see virtual lines shown in FIG. 13). Since the membrane electrode structure member 22 is still sucked by the suction portions 104, the membrane electrode structure member 22 is prevented from dropping down. When the grip portions 102 are opened, the grip portions 102 may be slightly lowered down once before they are opened in the horizontal direction. The reason for this is that the grip portions 102 are prevented from sliding on the surface of the membrane electrode structure member 22.

In Step S204, the second moving device 42 is lowered down and the membrane electrode structure member 22 is put onto the separator 24 accurately. In this case, since the separator 24 is maintained at a given height by the first clamps 32, when the second moving device 42 carries the membrane electrode structure member 22, there is eliminated the need for the delicate control of the membrane electrode structure member 22 according to the thickness of the separator 24, thereby simplifying the height control of the membrane electrode structure member 22.

Figure 16:
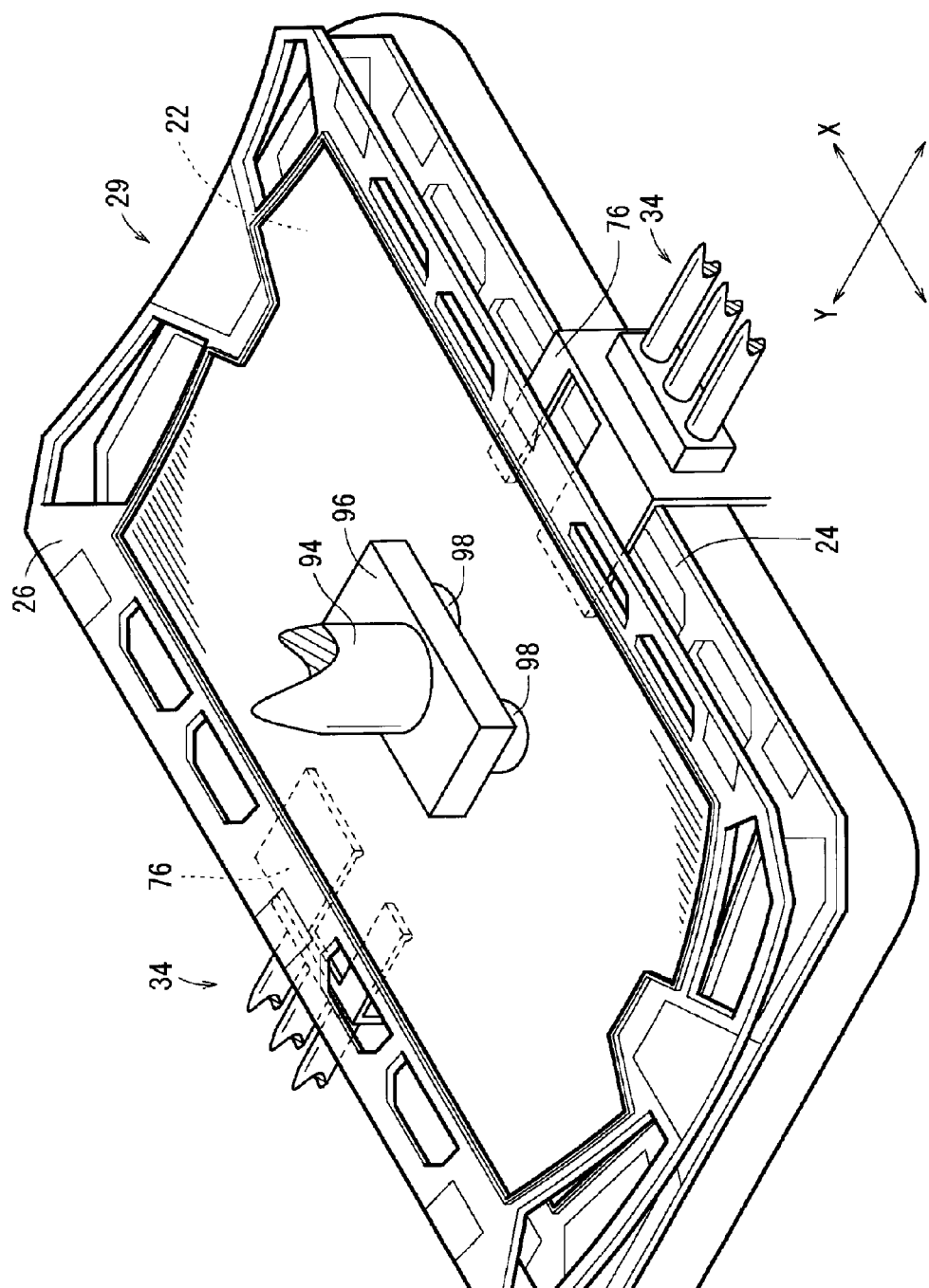
FIG. 16 is a perspective view of the upper-layer separator and membrane electrode structure member, showing a state where the upper-layer separator is superimposed on top of the membrane electrode structure member.

In Step S205, the second clamps 34 provided on the Y direction two ends of the placement base 30 are moved forward until the stopper surface 76b, is contacted with the end face of the placement base 30 (a previous stage before a state shown in FIG. 16).

In Step S206, the sucking operations of the suction portions 104 are caused to stop.

In Step S207, the second clamps 34 are lowered down due to the operations of the clamp lift portions 72, and thus the clamp members 76 are pressed against the upper surface of the membrane electrode structure member 22 with a proper force to thereby fix the membrane electrode structure member 22 (see FIG. 4).

That is, as the cylinders that constitute the clamp lift portions 72, there can be used, for example, an oil pressure cylinder, or a pneumatic cylinder, or a hydro-pneumatic cylinder.

Also, the cylinders are not limitative but there may also be used other type of pressing means which can fulfill a proper pressing force with respect to the upper surface of the membrane electrode structure member 22 (see FIG. 3). The pressing means, preferably, may include pressing force limiting means (not shown) such as a regulator or a relief valve for the hydro-pneumatic cylinder.

The lifting and lowering operations of the clamp lift portions 72 are carried out according to an operation instruction which is issued from the control portion 110. As the operation instruction, there can be used an electric signal, an optical signal, or other transmission medium using a physical principle.

The pressing force limiting means to be incorporated in the pressing means may preferably be structured such that it can be changed arbitrarily according to the operation instruction of the control portion 110. According to this structure, the pressing force of the second clamp 34 can be increased in the pressing direction properly, or can be decreased in the pressing direction properly in order that the second clamp 34 is in contact with an object to be clamped thereby but can hardly apply a pressing force of the second clamp 34 to the object.

In Step S208, the lift device 62 moves down the rod 62a to thereby lower the placement base 30 against the elastic forces of the coil springs 65. In this case, the second clamps 34 are moved down synchronously with the lowering operation of the placement base 30 to thereby maintain the fixed state of the separator 24 and membrane electrode structure member 22. Also, preferably, the second clamps 34 may be set such that the second clamps 34 can apply the pressing forces properly, thereby preventing the separator 24 and membrane electrode structure member 22 from being released. In Step S208, the first clamps 32 are maintained at their initial height and are thus spaced from the surface of the separator 24.

In Step S209, the first clamps 32 are retreated toward the original positions of the first clamps 32. Even when the first clamp members 70 retreat, the separator 24 and membrane electrode structure member 22 are held in the fixed state by the second clamp members 76.

In Step S210, the second moving device 42 is returned to the upward preparatory position of the placement base 30.

After then, the second moving device 42 is retreated to the position of the second stocker 38.

Next, description will be given below of the laminating operation of the upper-layer separator 24 (that is, a case where n=1, in the above-mentioned step S2).

Figure 14:
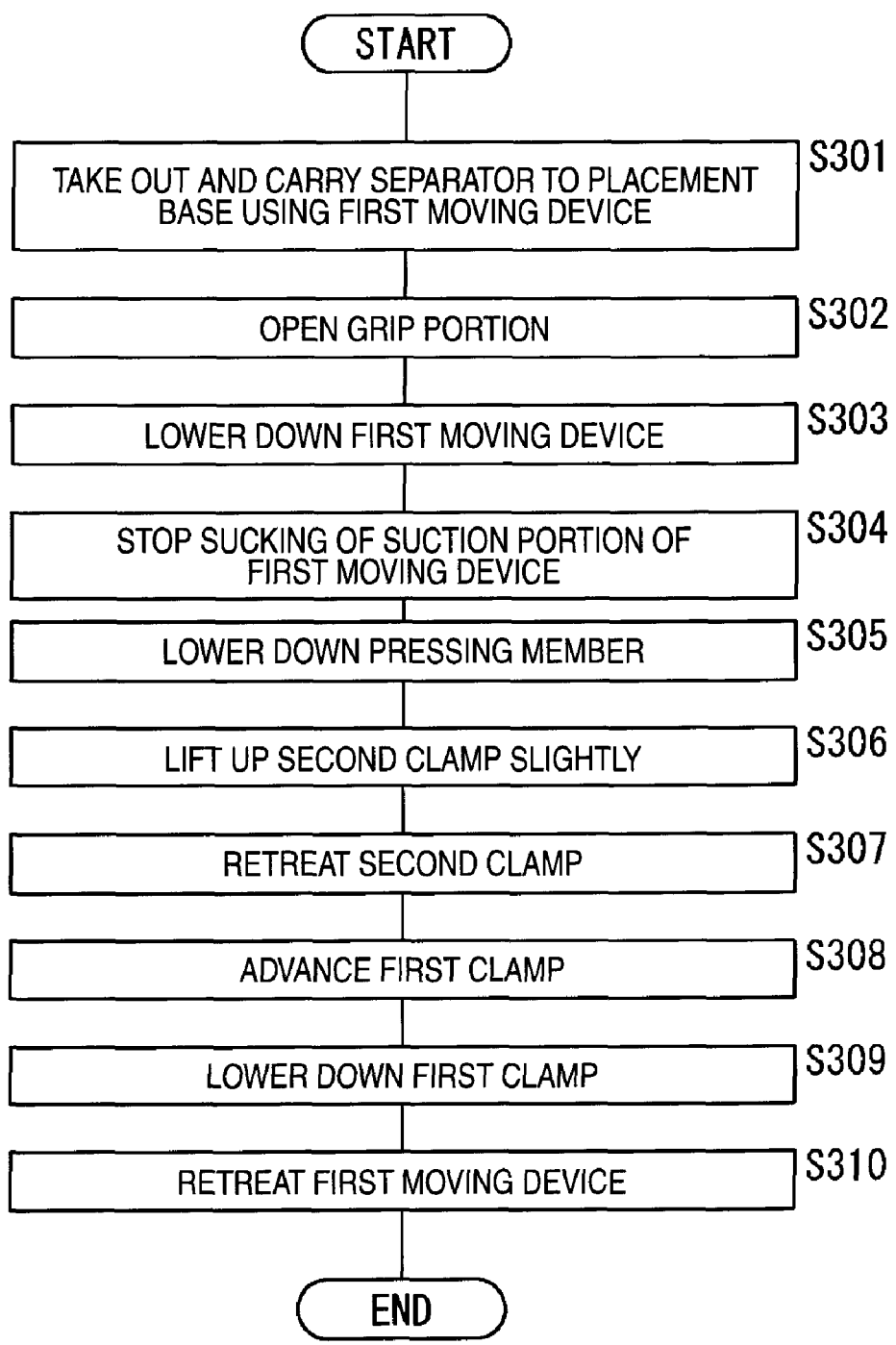
FIG. 14 is a flow chart of the procedure for placing an upper-layer separator.

Firstly, in Steps S301 to S303 shown in FIG. 14, there are carried out the same processings as in Steps S101 to S103 (see FIG. 8). In Step S301, similarly to the above-mentioned step S202, the position and direction of the placement base 30 may also be adjusted.

In Step S304, the sucking operations of the suction portions 84 are caused to stop.

Figure 15:
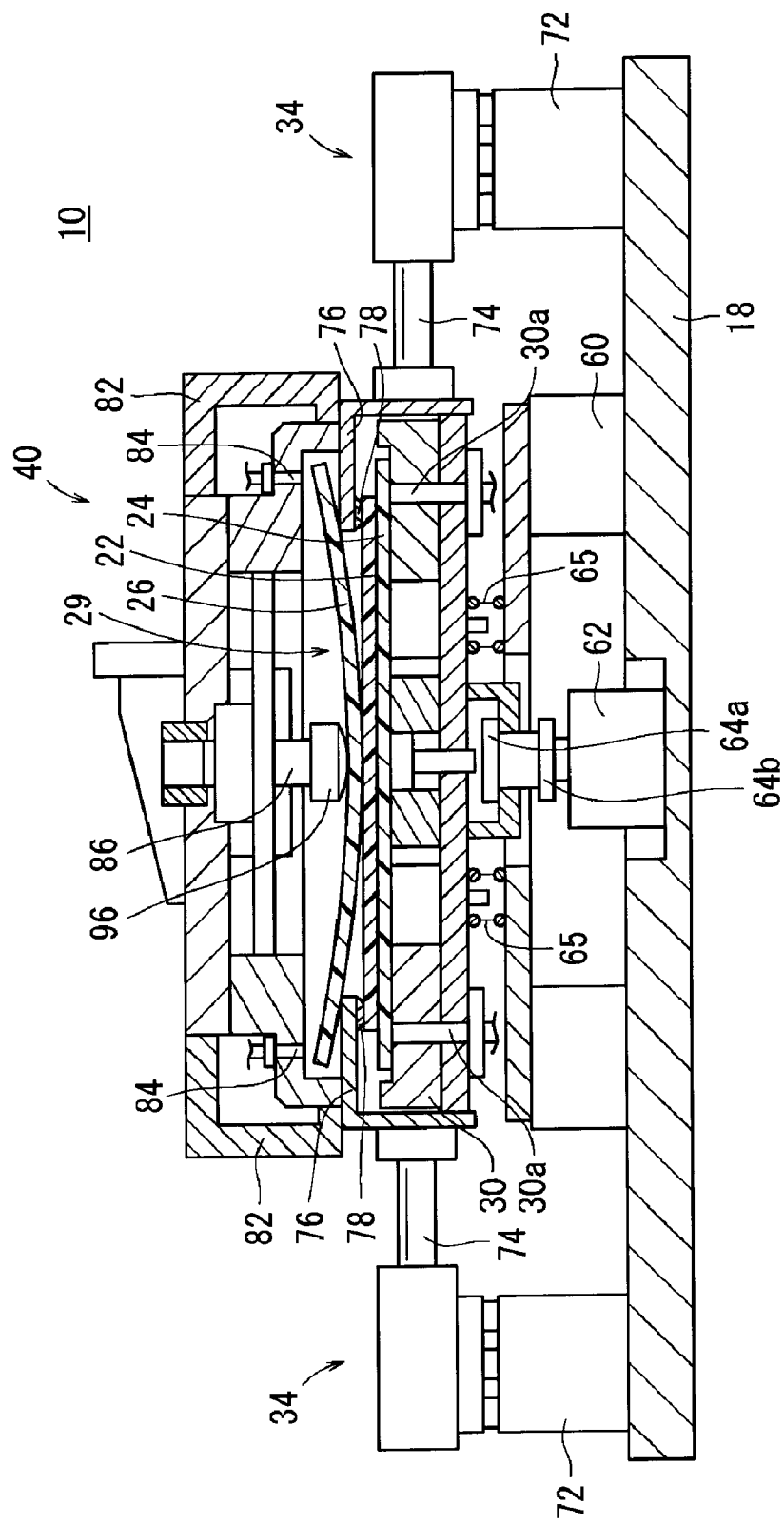
FIG. 15 is a sectional side view of the laminating apparatus, showing a state where the upper-layer separator is pressed in the central portion thereof by a pressing member.

In Step S305, as shown in FIG. 15, the pressing member 96 of the pressing jig 86 is lowered down, while the separator 26 is superimposed on top of the entire surface of the membrane electrode structure member 22 and on top of the partial portions of the clamp members 76 respectively disposed on the two ends of the placement base 30. The separator 24, membrane electrode structure member 22 and separator 26 are all fixed by the pressing jig 86.

As shown in FIG. 16, the pressing member 96 presses the separator 26 at two points spaced properly from each other in the X direction of the separator 26 to thereby prevent the rotation of the laminated assembly 29, which makes it possible to laminate or superimpose the composing elements of the laminated assembly 29 with more accuracy. In order to prevent the rotation of the laminated member 29, the pressing member 96 may press the separator 26 at least at two points, for example, the separator 26 may be supported at three points or may be supported linearly. Pads 98 on the lower-most surface of the pressing member 96 are respectively made of resin material and thus the pads 98 can protect the surface of the separator 26.

Figure 17:
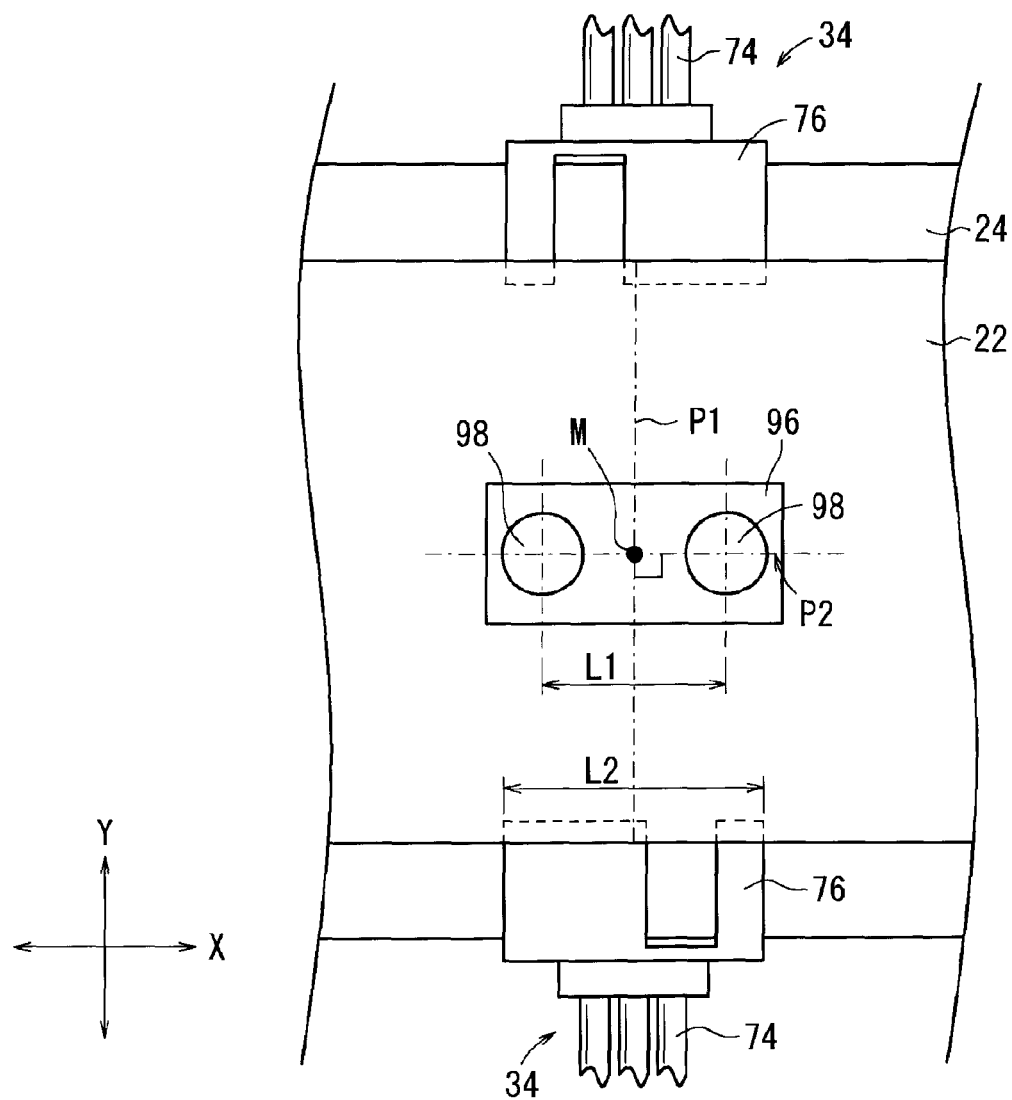
FIG. 17 is a plan view of the upper-layer separator and membrane electrode structure member, showing a state where the upper-layer separator is superimposed on top of the membrane electrode structure member.

As shown in FIG. 17, the longitudinal direction center line P1 of the pressing member 96 for pressing the separator 26 is perpendicular to a line P2, which connects together the respective centers of the two second clamps 34, at the middle point M of the line P2. Owing to this, the membrane electrode structure member 22 can be pressed in a well-balanced manner, thereby being able to prevent either side of the membrane electrode structure member 22 in the Y direction from being elastically deformed excessively.

Further, the X direction center lines of the two spaced contact surfaces (that is, the lower-most surface pads) 86 of the pressing member 96 for pressing the separator 26 are perpendicular to the line P2 which connects the center lines of the two clamps 34 to each other. The length (of the longitudinal direction center line) L1 of the separator 26 in the X direction may preferably be set equal or less than twice the length L2 of the second clamp 34, more preferably, the length L1 may be set within the range of the length L2.

Figure 18:
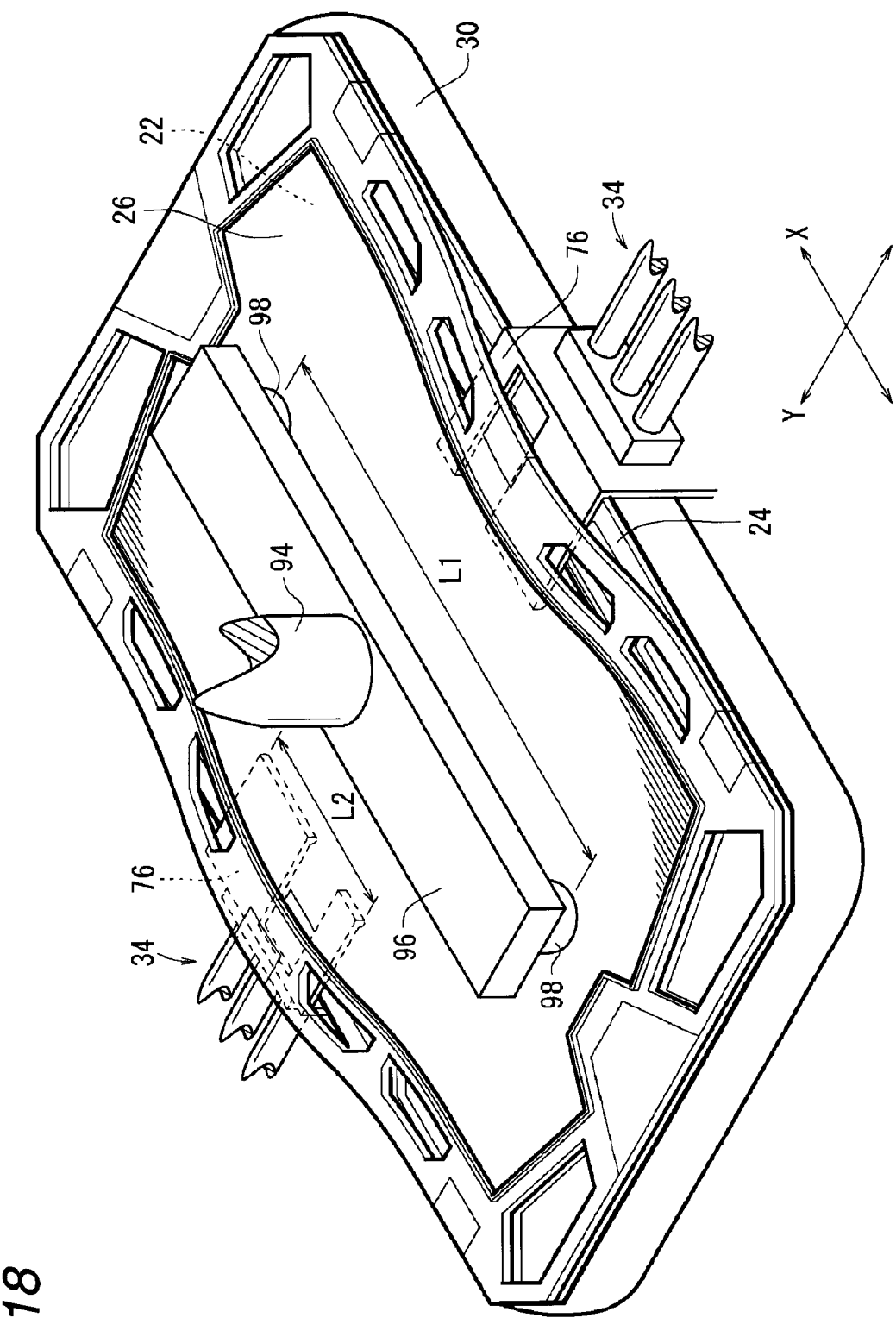
FIG. 18 is a perspective view of the upper-layer separator and placement base, showing a state where the upper-layer separator is superimposed in such a manner that it is expanded in an arc.

As shown in FIG. 18, when the length L1 is excessively long, there is a fear that the portion of the separator 26 for covering the second clamp 34 can be expanded in an arc.

On the other hand, when the length L1 is set within twice the length L2 of the second clamp 34 or in the range of the length L2, the arc-like expansion of the separator 26 can be prevented.

Figure 19:
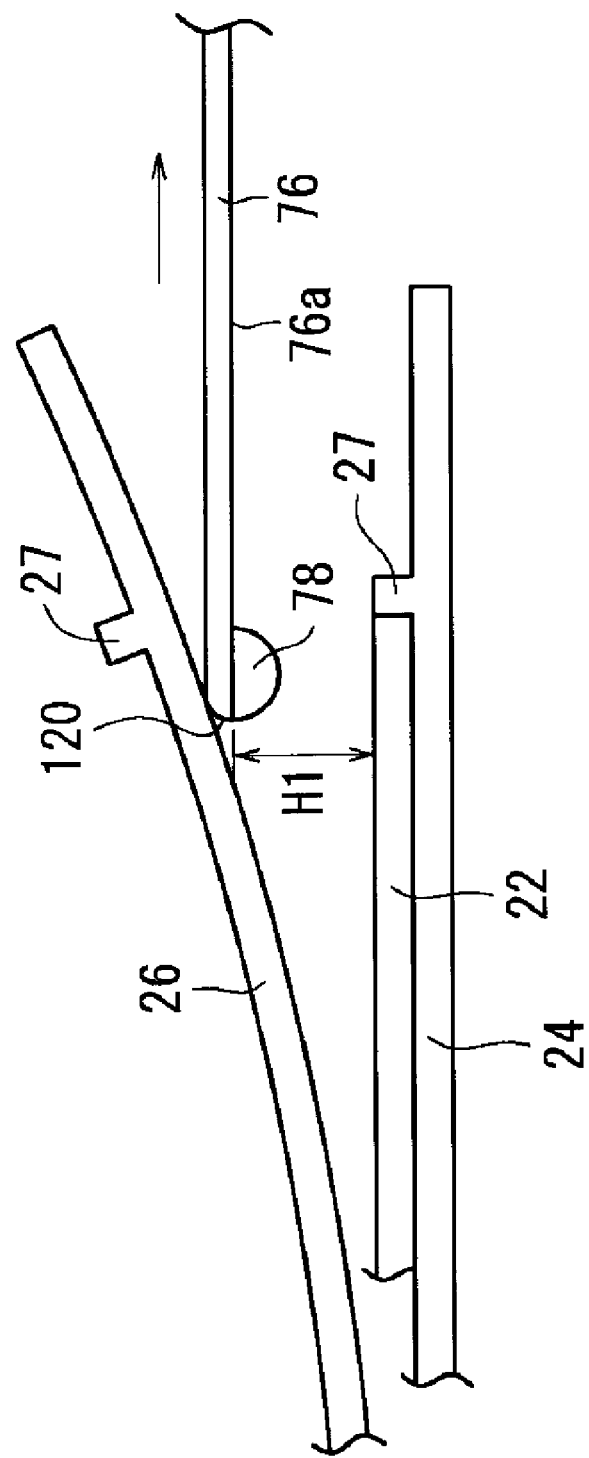
FIG. 19 is a sectional side view of the second clamp, showing a state where the clamp member of the second clamp is lifted slightly.

In Step S306, the second clamps 34 are slightly lifted up owing to the operation of their associated clamp lift portions 72. Thus, as shown in FIG. 19, clamp members 76 are respectively spaced from the upper surface of the membrane electrode structure member 22. This allows the upper-layer separator 26 to deform further elastically. The lifting height H1 of the second clamp 34 may be small, for example, approximately in the range of 0.5, mm to 5, mm.

Even when the second clamp members 76 are lifted up, the separator 24, membrane electrode structure member 22 and separator 26 can be held respectively in the fixed state by the pressing member 96.

In Step S307, the clamp members 76 of the second clamps 34 are retreated toward the respective original positions (in FIG. 19, in the right direction) of the clamp members 76. Owing to this, an arc portion 120 formed in the upper portion of the leading end of each clamp member 76 is moved in sliding contact with the lower surface of the separator 26. The second clamp 34 is soon separated from the upper-layer separator 26, and the separator 26 then falls on top of the membrane electrode structure member 22.

As described above, since the second clamp 34 is lifted up once by the clamp lift portion 72 and is then pulled out laterally by an advance/retreat portion 74, the second clamp 34 can be prevented from sliding on at least the upper surface of the membrane electrode structure member 22.

In Step S308, the first clamps 32 provided on the X direction two ends of the placement base 30 are moved forward until the stopper surface 70b, is contacted with the end face of the placement base 30.

In Step S309, the first clamps 32 are respectively lowered down due to the operation of their associated clamp lift portions 66, and the clamp members 70 are pressed against the upper surface of the upper-layer separator 26 with a proper force to thereby fix the separator 26.

Here, in this case, alternatively, the first clamps 32 may not be lowered down but, similarly to the above-mentioned step S107, the placement base 30 may be lifted up, whereby the separator 24, membrane electrode structure member 22 and separator 26 may be held by and between the placement base 30 and first clamps 32. In this case, the upper surface of the laminated assembly can be maintained at the height of the first clamps 32, thereby being able to simplify or eliminate the height control when the first and second moving devices 40 and 42 carry the respective sheet-shaped members. That is, when the laminated assembly includes four or more sheet-shaped members, it is possible to simplify the height control when carrying the membrane electrode structure member 22 and separators 24, 26 to be superimposed at and after the fourth time.

In Step S310, the first moving device 40 is returned to the upward preparatory position of the placement base 30.

After then, the first moving device 40 is retreated to the position of the first stocker 36. Therefore, the laminated assembly 29 is formed, the laminated assembly 29 is carried to the connecting pin striking apparatus 14, and a connecting pin is struck into a given insertion hole, thereby fastening the laminated assembly 29.

Referring further to the state where the laminated assembly 29 is carried to the connecting pin striking apparatus 14, while the laminated assembly 29 remains held by and between the placement base 30 and a pair of first clamps 32, the first clamps 32 and placement base 30 are integrally carried together with the base plate 18 to the connecting pin striking apparatus 14. Here, the laminated assembly 29 is formed as a unit cell on the placement base 30 provided on the base plate 18 of the laminating apparatus 10, and the pair of first clamps 32 respectively are provided on the longitudinal direction two ends of the placement base 30 and situated on the base plate 18.

Here, in the above example, the laminated assembly 29 is composed of three sheet-shaped members, that is, the lower-layer separator 24, membrane electrode structure member 22 and upper-layer separator 26. However, alternatively, the laminated assembly 29 may also be composed of five or more sheet-shaped members. For example, separators and membrane electrode structure members may be alternately superimposed on top of each other.

As described above, the laminating apparatus 10 according to the present embodiment includes two first clamps 32, a first moving device 40, two second clamps 34, a pressing member 96, and, two advance/retreat portions 74. Here, the two first clamps 32 are respectively used to hold a portion of the upper surface of the separator 24 put on the placement base 30. The first moving device 40 superimposes the membrane electrode structure member 22 on the upper surface of the lower-layer separator 24. The two second clamps 34 respectively hold a portion of the upper surface of the thus superimposed membrane electrode structure member 22. The pressing member 96, after the separator 26 is superimposed on the upper surfaces of the membrane electrode structure member 22 and second clamps 34, presses the separator 26 in the central portion of the separator 26 and elastically deforms the separator 26 to thereby bring the separator 26 contact with the membrane electrode structure member 22. The two advance/retreat portions 74 respectively pull out the clamp members 76 of the two second clamps 34 from between the membrane electrode structure member 22 and separator 26.

That is, the membrane electrode structure member 22, in the initial stage, is clamped by the two second clamps 34.

Next, after the membrane electrode structure member 22 is held by the pressing member 96 through the separator 26, the clamp members 76 are pulled out. Therefore, there is no stage in which the separator 26 is not fixed to the placement base 30, whereby the separator 26 is prevented from shifting in position. Accordingly, the membrane electrode structure member 22 and separators 24, 26 can be superimposed on top of each other accurately and quickly to provide the laminated assembly 29. This not only can realize the mass production and reduced cost of fuel cells but also can maintain the power generating performance of the fuel cells at a proper level.

The laminating method and laminating apparatus according to the invention are not limited to the above-mentioned embodiments but, of course, various structures and processes are possible without departing from the subject matter of the invention.

Although the invention has been described heretofore in detail and with reference to the specific embodiments thereof, it is also obvious to a person skilled in the art that various changes and modifications are also possible without departing from the spirit and scope of the invention.

The present application is based on the Japanese Patent Application (Patent Application No. 2007-116802) filed on Apr. 26, 2007, and thus the contents of the same are incorporated herein.

The invention claimed is:

1. A laminating apparatus for laminating sheet-shaped members for use in a fuel cell, the laminating apparatus, comprising:
    a placement means for receiving a first member;
    first clamp means for holding a portion of an upper surface of the first member against the placement means;
    a first moving means for superimposing a second member over the upper surface of the first member;
    second clamp means for holding a portion of an upper surface of the second member against the first member;
    a second moving means for superimposing a third member over the upper surface of the second member and a portion of the second clamp means;
    a pressing means for pressing the third member to elastically deform the third member and to bring at least a portion of the third member into contact with the second member; and
    actuation means which are connected to the second clamp means, respectively, for retracting the second clamp means from between the second member and the third member.

2. The laminating apparatus according to claim 1,
    wherein the first moving means and the second moving means are identical with each other.

3. The laminating apparatus according to claim 1,
    wherein the first moving means and the second moving means are different from each other.

4. A laminating apparatus for laminating sheet-shaped members for use in a fuel cell, the laminating apparatus, comprising:
    a placement base;
    a first clamp which holds a portion of an upper surface of a first member;
    a first placement device which superimposes a second member over the first member;
    a second clamp which holds a portion of an upper surface of the second member that is superimposed over the first member;
    a second placement device which superimposes a third member over the upper surface of the second member and a portion of the second clamp;
    a pressing member which presses the third member to elastically deform the third member and to bring at least a portion of the third member into contact with the second member; and
    an actuation member which is attached to the second clamp and retracts the second clamp from between the second member and the third member.

5. The laminating apparatus according to claim 4, P1 wherein the first placement device and the second placement device are identical with each other.

6. The laminating apparatus according to claim 4,
    wherein the first placement device and the second placement device are different from each other.

7. The laminating apparatus according to claim 4,
    wherein the first member, second member, and third member are sheet-shaped members.

8. The laminating appartus according to claim 4,
    wherein the actuation member comprises a clamp lift which lifts the second clamp off of the portion of the upper surface of the second member before the second clamp is retracted.

9. The laminating apparatus according to claim 4, further comprising:
    a lift device which lifts the placement base to press the portion of the upper surface of the first member against the first clamp such that the first clamp holds the first member.

10. The laminating apparatus according to claim 4, further comprising:
    a first clamp actuation member which is attached to the first clamp and retracts the first clamp once after the second member is superimposed over the first member, and moves a portion of the first clamp over the third member after the third member is superimposed over the upper surface of the second member.

11. The laminating apparatus according to claim 10, further comprising:
    a lift device which, after the portion of the first clamp is moved over the third member, lifts the placement base to press the third member against the portion of the first clamp to hold the first member, the second member, and the third member between the portion of the first clamp and the placement base.

12. The laminating apparatus according to claim 4,
    wherein the pressing member comprises at least two pads which are spaced apart from one another in a longitudinal direction of the third member.

13. The laminating apparatus according to claim 12,
    wherein the second clamp comprises two clamps respectively disposed at right and left sides of the placement base, and
    a center line of the longitudinal direction in which the at least two pads are disposed is substantially perpendicular to a line connecting together respective centers of the two clamps.

14. The laminating apparatus according to claim 13,
    wherein a distance between the at least two pads is less than or equal to twice a length of one of the second clamps.

15. A laminating apparatus for laminating sheet shaped members for use in a fuel cell, the laminating apparatus comprising:
    a base plate;
    two first clamp assemblies, which are mounted on the base plate, each of the two first claim assemblies comprising:
        a clamp member comprising a stopper surface and lower surface having a projection disposed on a portion thereof, the stopper surface being perpendicular to the lower surface;
        a clamp actuation portion which is attached to the stopper surface and moves the clamp member in a direction parallel to the base plate; and
        a clamp lift which is attached to the clamp actuation portion and moves the clamp member in a direction perpendicular to the base plate;
    two second clamp assemblies, which are mounted on the base plate, each of the two second claim assemblies comprising:
        a clamp member comprising a stopper surface and lower surface having a projection disposed on a portion thereof, the stopper surface being perpendicular to the lower surface;
        a clamp actuation portion which is attached to the stopper surface and moves the clamp member in a direction parallel to the base plate; and
        a clamp lift which attached to the clamp actuation portion and moves the clamp member in a direction perpendicular to the base plate;

a placement base which disposed so as to be parallel to the base plate;

a rod which is attached to the placement base;

a lift device which is attached to the rod and to the base plate and moves the placement base in a direction perpendicular to the base plate;

a plurality of moving devices which are moveable to pick up sheet shaped members and position the sheet shaped members on the placement base; and a pressing assembly, which is disposed on one of the plurality of moving devices, the pressing assembly comprising:

a pressing member comprising at least two pads spaced apart from one another;

a guide barrel;

a lift rod which is disposed in the guide barrel, an end of the lift rod being attached to the pressing member;

an actuation cylinder;

a link mechanism attached to the actuation cylinder; a pressing jig attached to the link mechanism and the lift rod.

* * * * *